United States Patent
Ramakrishnan et al.

(10) Patent No.: US 11,818,046 B2
(45) Date of Patent: Nov. 14, 2023

(54) COORDINATED CONGESTION CONTROL IN NETWORK-ATTACHED DEVICES

(71) Applicant: Samsung Electronics Co., Ltd., Suwon-si (KR)

(72) Inventors: Nithya Ramakrishnan, San Diego, CA (US); Caroline Diana Kahn, Santa Clara, CA (US); Thomas Edward Rainey, III, Escondido, CA (US)

(73) Assignee: SAMSUNG ELECTRONICS CO., LTD.

(*) Notice: Subject to any disclaimer, the term of this patent is extended or adjusted under 35 U.S.C. 154(b) by 101 days.

(21) Appl. No.: 17/229,862

(22) Filed: Apr. 13, 2021

(65) Prior Publication Data
US 2022/0239594 A1 Jul. 28, 2022

Related U.S. Application Data

(60) Provisional application No. 63/141,963, filed on Jan. 26, 2021.

(51) Int. Cl.
*H04W 28/02* (2009.01)
*H04L 47/12* (2022.01)

(52) U.S. Cl.
CPC .................................. *H04L 47/12* (2013.01)

(58) Field of Classification Search
CPC .............................. H04L 47/12; H04L 49/501
See application file for complete search history.

(56) References Cited

U.S. PATENT DOCUMENTS

| | | |
|---|---|---|
| 7,596,627 B2 | 9/2009 | Cometto et al. |
| 8,537,664 B2 | 9/2013 | Goldfein et al. |
| 9,240,906 B2 | 1/2016 | Edwards et al. |
| 9,253,096 B2 | 2/2016 | Chrysos et al. |
| 9,571,402 B2 | 2/2017 | Kumar et al. |
| 10,063,638 B2 | 8/2018 | Huang |

(Continued)

FOREIGN PATENT DOCUMENTS

WO 2016196766 A2 12/2016

OTHER PUBLICATIONS

Sherman, Brian et al., "NVMe over Fibre Channel", IBM/Brocade 2nd Special Edition, John Wiley & Sons, Inc., (https://www.ibm.com/downloads/cas/MLAEO6R8), Oct. 15, 2017, 68 pages.

*Primary Examiner* — Donald L Mills
(74) *Attorney, Agent, or Firm* — Renaissance IP Law Group LLP

(57) ABSTRACT

A device is described. The device may include a network port to connect to a network. The device may include a first controller configured to send and receive a first communication across the network using the network port. The device may include storage for a controller record for the controller may store a congestion score, a congestion timestamp, and an uncongested timestamp. The device may also include storage for a device-wide record including at least a second congestion score and a second congestion timestamp for the first controller and a third congestion score and a third congestion timestamp for a second controller. The device-wide record may be based at least in part on the controller record. A throttle may limit a second communication of a second controller based at least in part on the device-wide record.

20 Claims, 18 Drawing Sheets

(56) References Cited

U.S. PATENT DOCUMENTS

| | | |
|---|---|---|
| 10,225,199 B2 | 3/2019 | Beliveau et al. |
| 10,348,594 B2 | 7/2019 | Edwards et al. |
| 10,545,669 B2 | 1/2020 | Dayan et al. |
| 2015/0341273 A1 | 11/2015 | Naouri et al. |
| 2020/0084150 A1* | 3/2020 | Burstein ............... H04L 47/805 |
| 2020/0228602 A1* | 7/2020 | Spoczynski ............. H04L 67/56 |
| 2020/0236052 A1 | 7/2020 | Srinivasan et al. |
| 2020/0280518 A1 | 9/2020 | Lee et al. |
| 2020/0343974 A1* | 10/2020 | Dreier ................... G06F 3/0659 |
| 2021/0194786 A1* | 6/2021 | Prohofsky ........... H04L 67/1097 |
| 2021/0399990 A1* | 12/2021 | Wang .................... H04L 47/263 |
| 2022/0045969 A1* | 2/2022 | L'Ecuyer ................ H04L 49/90 |
| 2022/0210075 A1* | 6/2022 | Musleh ................ H04L 47/127 |

* cited by examiner

Controller Associativity Matrix ($M_C$)

220

|  | $C_1$ | $C_2$ | $C_3$ | $C_4$ | ... | $C_m$ |
|---|---|---|---|---|---|---|
| $C_1$ | 1 | 1 | 0 | 0 | ... | 0 |
| $C_2$ | 1 | 1 | 0 | 0 | ... | 0 |
| $C_3$ | 0 | 0 | 1 | 1 | ... | 0 |
| $C_4$ | 0 | 0 | 1 | 1 | ... | 0 |
| ⋮ | ⋮ | ⋮ | ⋮ | ⋮ | ⋱ | ⋮ |
| $C_m$ | 0 | 0 | 0 | 0 | ... | 1 |

FIG. 9

System Level Associativity Matrix ($M_{Sys}$)

225

|  | $C_1$ | $C_2$ | $C_3$ | $C_4$ | ... | $C_m$ |
|---|---|---|---|---|---|---|
| $C_1$ | 1 | 0 | 1 | 0 | ... | 1 |
| $C_2$ | 0 | 1 | 0 | 1 | ... | 0 |
| $C_3$ | 1 | 0 | 1 | 0 | ... | 0 |
| $C_4$ | 0 | 1 | 0 | 1 | ... | 0 |
| ⋮ | ⋮ | ⋮ | ⋮ | ⋮ | ⋱ | ⋮ |
| $C_m$ | 1 | 0 | 0 | 0 | ... | 1 |

FIG. 10

Controller Record

230

| | $QP_1$ | $QP_2$ | $QP_3$ | $QP_4$ | ... | $QP_n$ |
|---|---|---|---|---|---|---|
| Class of Service | $P_{QP1}$ | $P_{QP2}$ | $P_{QP3}$ | $P_{QP4}$ | ... | $P_{QPn}$ |
| Weighted Congestion Score | $W_{CS1}$ | $W_{CS2}$ | $W_{CS3}$ | $W_{CS4}$ | ... | $W_{CSn}$ |
| Congestion Timestamp | $T_{CN1}$ | $T_{CN2}$ | $T_{CN3}$ | $T_{CN4}$ | ... | $T_{CNn}$ |
| Normal Timestamp | $T_{N1}$ | $T_{N2}$ | $T_{N3}$ | $T_{N4}$ | ... | $T_{Nn}$ |

FIG. 11

Device-Wide Record

235

| Controller | $P_0$ | $P_1$ | $P_2$ | $P_3$ | $P_4$ | $P_5$ |
|---|---|---|---|---|---|---|
| $C_1$ | $T_{CN1P0}$ | $T_{CN1P1}$ | $T_{CN1P2}$ | $T_{CN1P3}$ | $T_{CN1P4}$ | $T_{CN1P5}$ |
| | $W_{CS1P0}$ | $W_{CS1P1}$ | $W_{CS1P2}$ | $W_{CS1P3}$ | $W_{CS1P4}$ | $W_{CS1P5}$ |
| $C_2$ | $T_{CN2P0}$ | $T_{CN2P1}$ | $T_{CN2P2}$ | $T_{CN2P3}$ | $T_{CN2P4}$ | $T_{CN2P5}$ |
| | $W_{CS1P0}$ | $W_{CS1P1}$ | $W_{CS1P2}$ | $W_{CS1P3}$ | $W_{CS1P4}$ | $W_{CS1P5}$ |
| ⋮ | | | | | | |
| $C_m$ | $T_{CNmP0}$ | $T_{CNmP1}$ | $T_{CNmP2}$ | $T_{CNmP3}$ | $T_{CNmP4}$ | $T_{CNmP5}$ |
| | $W_{CS1P0}$ | $W_{CS1P1}$ | $W_{CS1P2}$ | $W_{CS1P3}$ | $W_{CS1P4}$ | $W_{CS1P5}$ |

FIG. 12

COORDINATED CONGESTION CONTROL IN NETWORK-ATTACHED DEVICES

RELATED APPLICATION DATA

This application claims the benefit of U.S. Provisional Patent Application Ser. No. 63/141,963, filed Jan. 26, 2021, which is incorporated by reference herein for all purposes.

FIELD

The disclosure relates generally to network-attached devices, and more particularly to managing congestion in network-attached storage devices.

BACKGROUND

Network-attached storage devices, such as Ethernet-attached storage devices, permit other devices to communicate directly with the storage device, rather than with a processor that may be part of a larger system including the storage device. By eliminating a system processor, memory, and other components from the overall system, power requirements may be reduced. In addition, since components such as the processor may be removed from the communication path, the time required before an input/output operation completes may be reduced.

But as storage devices grow in size, so does the amount of data written to those storage devices. Files and datasets may become larger, with larger amounts of data being sent over the network connecting the storage device with the application using the data. Just as the number of cars on a highway increase the traffic and may lead to congestion (slowing down all traffic), so too may the increased network traffic result in congestion, which may slow down the delivery of information across the network.

A need remains for a mechanism to manage congestion of network traffic.

BRIEF DESCRIPTION OF THE DRAWINGS

The drawings described below are examples of how embodiments of the disclosure may be implemented, and are not intended to limit embodiments of the disclosure. Individual embodiments of the disclosure may include elements not shown in particular figures and/or may omit elements shown in particular figures. The drawings are intended to provide illustration and may not be to scale.

FIG. 9 shows details of the controller associativity matrix of FIG. 2, according to embodiments of the disclosure.

FIG. 10 shows details of the system level associativity matrix of FIG. 2, according to embodiments of the disclosure.

FIG. 11 shows details of the controller record of FIG. 2, according to embodiments of the disclosure.

FIG. 12 shows details of the device-wide record of FIG. 2, according to embodiments of the disclosure.

SUMMARY

Figure 1:
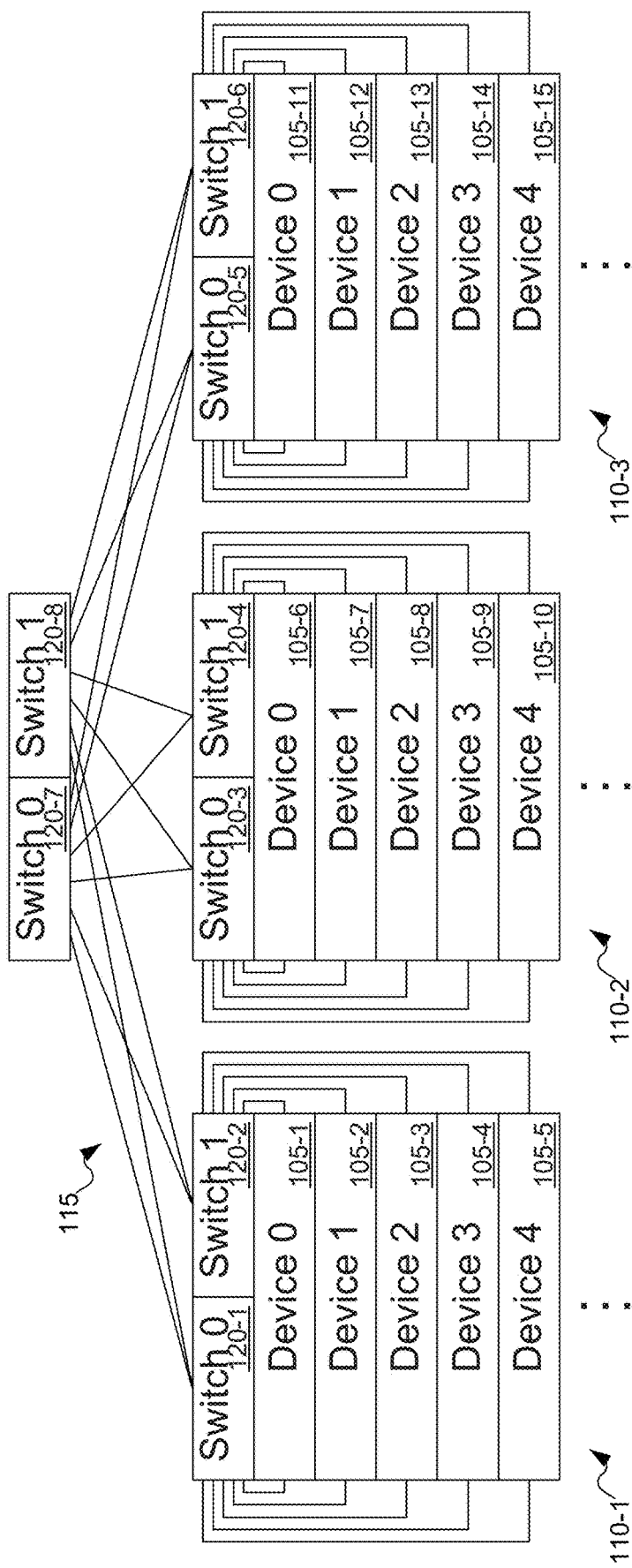
FIG. 1 shows a system including devices connected via a network, according to embodiments of the disclosure.

Embodiments of the disclosure include devices in a network. The devices may include controllers, and may determine whether controllers are associated based on sharing some communication path with another controller. If controllers are associated and one controller experiences congestion, an associated controller may proactively apply congestion control as well.

DETAILED DESCRIPTION

Reference will now be made in detail to embodiments of the disclosure, examples of which are illustrated in the accompanying drawings. In the following detailed description, numerous specific details are set forth to enable a thorough understanding of the disclosure. It should be understood, however, that persons having ordinary skill in the art may practice the disclosure without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first module could be termed a second module, and, similarly, a second module could be termed a first module, without departing from the scope of the disclosure.

The terminology used in the description of the disclosure herein is for the purpose of describing particular embodiments only and is not intended to be limiting of the disclosure. As used in the description of the disclosure and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

Construction of an efficient network may be important for datacenters serving Big Data, Artificial Intelligence (AI)/Machine Learning (ML), cloud-based network storage workloads, etc., where maintaining the Service Level Agreements (SLAs) for throughput and latency may be important. Non-Volatile Memory Express (NVMe) Over Fabrics (NVMe-oF) technology is one form of storage device used in datacenters, as NVMe supports parallelism for storage command executions over a network fabric. Ethernet is an often-used network protocol deployed in datacenters, as it is more prevalent, cost efficient and easy to manage. NVMe over Transmission Control Protocol (TCP) (NVMe/TCP) and NVMe over Remove Direct Memory Access (RDMA) over Converged Networks (NVMe/RoCE) (using any version of RoCE) are commonly-used Ethernet-based protocols currently available that enable the connectivity between NVMe-oF initiators and their targets. But while the discussion above (and below) may focus on NVMe storage devices and specific Ethernet-related protocols, embodiments of the disclosure may extend to any storage device that supports network attachment, regardless of the storage protocol or network protocol being used.

In some embodiments of the disclosure, approximately 80% of the traffic generated by modern workloads may remain within the datacenter: that is, both the initiator and the target may be within the datacenter. Network congestions may occur in datacenters: the aim of any device in the datacenter is to recover quickly from network congestion. NVMe targets may be a major contributor to congestion as they may serve multiple initiators in the datacenters simultaneously.

A mechanism for predicting when an NVMe-oF target may proactively take action to reduce congestion in the datacenter, when there are multiple initiators connected to the same target or when there are multiple connections going to the same initiator from the target, would help in reducing such congestion.

A server that exports the NVMe devices to the initiator over the fabrics is termed an NVMe-oF target. This server may be a single server that exports one or more NVMe Solid State Drives (SSDs) or Ethernet-attached SSDs. Further, a target may have one or more network interfaces, each of which may function independently from other network interfaces. In addition, the target may allow an initiator to open one or more NVMe-oF queue pairs for I/O command submissions. Each NVMe-oF queue pair may offer an independent and parallel network path to the NVMe queues in the storage device. In some embodiments of the disclosure, a command sent in one NVMe-oF queue pair may be processed by the same queue pair (that is, the response to the I/O command may be sent using the same NVMe-oF queue pair). Each target may support one or more administrative queue pairs and one or more I/O queue pairs. Administrative queue pairs may be used infrequently; embodiments of the disclosure may be used with just the I/O queue pairs (which may be used for data transmission), with just the administrative queue pairs (which may be used for administration of the NVMe target), or with both sets of queue pairs.

The term NVMe-oF target may refer to the software that manages the storage device and the network connections, and may facilitate the remote initiators to access the storage.

The term NVMe-oF initiator or host may refer to the server that connects to the NVMe-oF target over the fabric to perform storage operations. The term NVMe-oF initiator may also refer to the software that enables an application to access a remote NVMe-oF target. Each NVMe-oF initiator may have a unique host ID. The NVMe-oF initiator may be a single physical server or a virtual machine (VM) hosted on a physical server. Multiple virtual machines hosted on a single physical server may also be initiators that are connected to the same NVMe-oF target. Because multiple VMs hosted on a physical server may have different Internet Protocol (IP) addresses and multiple host IDs, these VMs may appear to the NVMe-oF target as distinct NVMe-oF initiators. But since these VMs share the same network interface card (NIC) and the internal software switch on the physical server, if there is a congestion on that internal switch or if the shared NIC may not handle the incoming packets, then some or all of the VMs will be affected.

The term NVMe-oF controller may refer to an abstract entity that represents a one-to-one relationship between a single initiator network port and a single target network port. Each NVMe-oF controller pair may have an independent set of NVMe queue pair(s), separate network connections, and may perform parallel I/O operations. By using multiple queue pairs, the throughput may be increased through multiple parallel connections or providing separate paths for I/O commands: for example, according to their size, priority, etc.

An NVMe-oF controller may associate an NVMe queue pair with a network connection to create an NVMe-oF queue pair. The NVMe-oF queue pair over an ethernet fabric may be associated with a TCP or User Datagram Protocol (UDP) port.

Network Topology

Embodiments of the disclosure may be suitable for deployments where the NVMe-oF targets and initiators may be arranged in racks or clusters with the network topology using a 2-tier switching fabric, which may be termed a leaf spine topology (sometimes termed a spine-leaf topology or a leaf-and-spine topology). Embodiments of the disclosure may also be applicable in other topologies as well: but as the number of switches that connect a target and an initiator increases, the number of different paths through the network increases, which has an inverse effect on the ability to predict congestion: as the number of paths through the network increases, the efficacy of a prediction of congestion is reduced.

In a leaf spine topology, a rack consists of a set of devices installed in a common enclosure. These devices may be connected to one or more switches located within the rack (often termed top-of-rack (TOR) switches or leaf switches). These TOR switches connect to another set of switches, which interconnect the racks: collectively these switches may be termed as the spine, and interconnect the racks/ leaves. The connections between the leaf switches and the spine switches may operate at layer 2 (switched) or layer 3 (routed) connections. If each leaf switch connects to each spine switch, there is always a path from any device in the topology to every other device. In such embodiments of the disclosure, the spine switches may not need to interconnect with each other, and the leaf switches may not need to interconnect with each other.

As there may be multiple devices within a rack, there may be multiple NVMe-oF targets in a rack. As a single NVMe-oF target may have multiple network ports, the multiple network ports in an NVMe-oF target may be connected to a common TOR switch or to different TOR switches. Individual NVMe-oF queue pairs from a target to single or multiple initiators may be switched through different paths as determined by the switches.

Multiple NVMe-oF targets might be transmitting network packets to the same or different initiators simultaneously. Thus, network congestion may happen at the TOR leaf switches or the spine switches.

It may be possible to determine whether the NVMe-oF target and an initiator are connected to the same rack or cluster by identifying the network address of the switch to which the target and the initiators are connected. For example, there are software tools available to identity the IP addresses of leaf and spine switches used by network connections, which may be used by NVMe-oF queue pairs. Depending on the locations of the target and initiator within the topology, the connections between the NVMe-oF target and initiators might be at the rack level (i.e., through just the TOR switch) or at the cluster level (through both TOR switches and a spine switch). Different TOR switches and spine switches may be used to transmit network packets for an NVMe-oF queue pair. In some embodiments of the disclosure, switches may use an Equal Cost Multipathing (ECMP) scheme to determine the network path based on a combination of source and destination IP addresses, source and destination TCP/UDP ports, transport protocol, etc. In some embodiments of the disclosure, switches may continue to use the same path to route packets between a target and an initiator until network conditions (such as congestion or a connection failure) cause a new routing to be used.

Datacenter Network Congestion

Datacenter networks may require high bandwidth, low latency network connections usually switched through shallow buffered switches (i.e., switches with small buffers to store network traffic). The network traffic may be unpredictable, subject to bursts, and prone to incast-types (many targets sending data to the same host) of network congestions. For example, a single host device might host multiple VMs, which may share the network interface to the TOR switch. If it is the host that has issues due to incast, the switch connected to host may be congested, which may affect all connections to the host from different spine switches.

Congestion may be more common at the TOR switches than at the intermediate switches or routers. Similarly, if multiple connections from the target are routed through the same spine switch, or if servers from the same rack are trying to transmit data to hosts in the same cluster through the same spine switch, then the TOR switch serving the target may become congested. If a congestion is experienced by one or more of the connections from the target to the host/cluster, there is a probability that another connection to the same host/cluster might also experience congestion.

Network Congestion Handling at the Switches

Switches may have internal buffers which may queue some network packets before forwarding them to their destinations. Switches operating at layer 3 may support a feature called explicit congestion notification (ECN) to notify the senders and receivers about the congestion at the switch. ECN schemes may be used by TCP, RoCE, QUIC (which is not an acronym), etc.

ECN schemes are three point schemes, where the switch may mark a packet as experiencing congestion and send the marked packet to the receiver. The receiver may then send a message to the sender, indicating the congestion. The sender may then take action to control congestion. In such a scheme, there may be a delay in implementing this congestion control, due to the lag between when the switch marks the packet to indicate congestion and when the sender is notified by the receiver of the congestion. Other congestion control schemes that permit the switch to directly indicate the congestion to the sender directly may also be possible.

The network connections may be lossy (i.e., data may be lost) or lossless (i.e., no data is lost), depending on how the network congestion is handled by all the associated network devices. A lossy fabric may drop packets in cases of severe congestion. The sender may then retransmit the network packets to the recipient. A lossless fabric, on the other hand, may have mechanisms to let the sender hold network packets until the congestion is cleared, so that no data is lost. In a lossless fabric, the network packets may not be dropped, just delayed.

In both the lossy and lossless fabric, to get the best network performance, the sender may need to be notified or be otherwise aware of the network congestion situation and take action early. If the sender does not take early action in a lossy fabric packets may be lost; if the sender does not take early action in a lossless fabric there may be unnecessary back pressure that may cause other performance degradations.

Modern switches may segregate traffic based on the network priority of the packets. But all traffic of the same priority going to the same destination switch may have the same chance of becoming congested, if the switch is not able to handle the incoming network traffic.

The network congestion detection and control at the network transport layer may only work per connection. Such a mechanism may not determine the intermediate switches/routers the network packets may travel through, as the intermediate switches/routers might change dynamically. Thus, the transport layer may not group connections going to the same destination and apply a congestion control action equally, when one or more of the connections indicate congestion. Identifying and correcting this issue is one subject of this disclosure.

ECN based schemes (TCP, Data Center TCP (DCTCP), Data Center Quantized Congestion Notification (DCQCN), and others) may be used by a device to be notified about congestion at the switches/routers. But there may be other methods to detect congestion at the devices that do not require any notification from switches/routers. For example, the devices may check the network packet losses, packet retransmissions, packet delays, and other network statistics to identify that a connection is experiencing congestion. Though it may not be possible to determine whether the issue is at the switches/routers or due to the congestion at the endpoint alone in this case, a congestion at the switch/router may be inferred if multiple connections going to multiple initiators exhibit these congestion characteristics.

NVMe-oF Message Exchanges

NVMe-oF devices may use an asynchronous mode of message transfer. An initiator may send multiple storage I/O commands to a target. These commands may be queued in the target. The order of these I/O commands might not be maintained when the commands are processed by the target and completed. Once the I/O commands are processed, the target may send a response to the initiator. There may be a delay between the time an I/O command is sent by the initiator and the time when the target completes the action and sends the response. In this time, the network condition in the datacenter may change.

In addition, there might not be a one-to-one correspondence between I/O commands sent by the initiator and response packets sent by the target. For example, the initiator might send a single I/O command to read a large amount of data: so large that the data might not fit into a single packet in response. In such situations, the target may send multiple packets in response to a single I/O command received from the initiator.

While the target is processing commands, such as read requests, the queue pair may receive other I/O commands from the initiator and queue them. There may be a continuous flow of data between initiator and target.

As discussed above, NVMe-oF devices may operate differently from other network devices. An NVMe-oF queue pair may be a logical construct that attaches a network socket (TCP/UDP) to an NVMe queue. I/O queue pairs may be used for data transfer. The initiator may send the I/O command in one NVMe-oF queue pair: in some embodiments of the disclosure the target must respond in the same queue pair. If the initiator uses multiple NVMe-oF queue pairs, then the target may respond in the same queue pairs that were used for the I/O commands.

In normal networks all network connections may be treated equally. When applications use multiple parallel connections for load balancing, the server may use any number of those parallel connections. In the event of network congestion, the server may use a reduced number of parallel connections to reduce the congestion.

But in in embodiments of the disclosure where responses are sent in the same NVMe-oF queue pair as the I/O command, the target may not be able to reduce the number of queue pairs as the network conditions change. The target may need another way to reduce the rate of network traffic sent across the datacenter network, while giving all the NVMe-oF queue pairs a chance to send their data. If an initiator does not receive a response in a queue pair, the initiator may resubmit the request, which might result in duplication of work.

Queue pairs in the NVMe-oF target might not share information about observed congestion at the rack or cluster level. The transport layers that perform congestion control have schemes that applies to generic environments, and do not take proactive congestion control actions. Small and closed topologies may benefit from additional measures that may be taken at the application layer, based on the specific nature of the applications, to improve the overall efficiency of the system.

Target Congestion Management

In embodiments of the disclosure, the focus may be on how targets handle congestion when sending data in response to read requests. But embodiments of the disclosure are adaptable to initiators sending write requests to targets as well. Similarly, while the focus may be on NVMe-oF queue pairs, embodiments of the disclosure are adaptable to any implementation that manages congestion without reducing the number of ways data may be routed.

An NVMe-oF target may proactively take action on a network connection to reduce congestion in the datacenter. The determination whether or not to take action to reduce congestion may be based on prior congestions reported by other network connections in the same target. The NVMe-oF target may be able to react to congestion before existing ECN schemes may inform the target of the congestion.

An NVMe-oF target may determine which queue pairs (NVMe-oF controllers) may be associated with the same host, rack, and cluster using information available in the NVMe-oF commands (such as the host ID and other such data) and network headers (such as the source IP address and other such data). Since congestion may happen in queue pairs going to the same host or in those queue pairs going to the same cluster, such association information may permit a prediction of congestion for a particular queue pair.

Each NVMe-oF controller may have a congestion score per Class of Service (CoS) priority based on the cumulative congestion scores of its queue pairs. This congestion score may quantize the congestion experienced during read command transmissions, based on congestion notification information received by the queue pairs.

The priority of the queue pair may be set based on an administrative setting, a socket priority setting, or a Differentiated Services Code Point (DSCP) value set in the IP packets received from the initiator. The priority settings obtained may be mapped to a CoS value, which may range, for example, from 0-5. In some embodiments of the disclosure, only some possible CoS values may be used for data transmissions; in other embodiments of the disclosure, all possible CoS values may be used for data transmissions.

A probabilistic prediction of congestion may be made using the congestion scores and information about associated controllers, which may permit taking a proactive congestion control action at the application layer. A target device may predict and apply rate limiting at the NVMe-oF layer for a short interval, based on congestion noticed by associated queue pairs in the same CoS, which may reduce congestion faster. Rate limiting may be done on connections associated with the connection that received a congestion notification: other connections may not be implicated. Rate limiting may help improve overall efficiency of the target through better scheduling of I/O transmissions from unaffected queue pairs, while other queue pairs may be predicted to experience congestion. The send rate limitation applied to the affected queue pairs may complement the congestion control action taken at the transport layer.

One service thread in the target may perform path tracing to identify the intermediate switches between the target and the initiators. The IP address of the authenticated initiators may be already available (for example, from packet headers). Otherwise this information may be obtained when initiators make a connection. When NVMe-oF initiators make a connection to the multiple interfaces of the target, those controllers may be grouped into associated controllers and entered into a controller associativity matrix, which may be labeled $M_C$. In the controller associativity matrix $M_C$, a value of 1 may indicate that two controllers are associated; a value of 0 may indicate that two controllers are not associated.

In addition, when NVMe-oF initiators make a connection, the controllers connecting to the same destination (rack or cluster) may be grouped into system level-associated controllers and entered into a system level associativity matrix, which may be labeled $M_{Sys}$. In this context, the term system refers to the device (i.e., the target): each target may have its own system level associativity matrix $M_{Sys}$. In the system level associativity matrix $M_{Sys}$, a value of 1 may indicate that two controllers are associated through a switch; a value of 0 may indicate that two controllers are not associated through a switch. In addition, degrees of associativity may be represented, where a value of 1 may indicate the maximum possible associativity (for example, that the two controllers share all intermediary switches), a value of 0 may indicate the minimum possible associativity (for example, that the two controllers do not share any intermediary switches), and values between 0 and 1 may indicate some (but not all) shared intermediary switches. For example, the values in the system level associativity matrix $M_{Sys}$ may be computed as the ratio of the number of shared intermediary switches relative to the total number of intermediary switches of one (or the other) connection.

Each controller may also have a record of its congestion score and timestamps. The controller may store this record with separate entries for each queue pair supported by the controller. For each queue pair, the record may include the CoS/priority assigned to the queue pair, the reception timestamp of the last packet including a congestion notification (which may include, for example, a packet marked by an ECN scheme), the reception timestamp of the last packet without a congestion notification, and a weighted congestion score. The timestamps for normal network events per queue pair may be obtained, for example, from asynchronous write data received at the NVMe-oF transport layer. The weights used in the weighted congestion score may factor in how likely it is that a particular queue pair may be affected by congestion in another queue pair, or how likely it is that congestion in the queue pair may affect another queue pair. The weights attached to the congestion may be expected to be reduced in proportion to the frequency of congestion in the queue pair. By having the weights in proportion to the frequency of congestion in the queue pair, the mechanism may isolate queue pairs/controllers that may frequently experience congestion but that may not spread to other connections.

Whenever a congestion notification is received, the cumulative congestion score per priority per controller may be calculated. This cumulative congestion score may be calculated only for queue pairs experiencing congestion: that is, queue pairs whose timestamp of the last packet with a congestion notification is more recent than the timestamp of the last packet without a congestion notification. Queue pairs that may not be currently experiencing congestion might not factor into the cumulative congestion score In addition, the cumulative congestion score may be calculated for queue pairs whose timestamp of the last packet with a congestion notification is within some predefined amount of time. For example, if a queue pair whose most recent packet included a congestion notification was received an hour ago, the fact that the queue pair was experiencing congestion an hour ago may not necessarily reflect that the queue pair is currently experiencing congestion. Example intervals after which old congestion notifications might be dropped from the calculation of the cumulate congestion score may include any desired length of time, such as three seconds. Congestion scores may also be cleared periodically, at any desired interval, such as after five minutes, 15 minutes, or 30 minutes.

Once the cumulative congestion score for a queue pair is calculated, the cumulative congestion score may be used to update a target-wide record. The target-wide record may represent a matrix for each controller and each CoS/priority. In the target-wide record, for each controller, for each priority, and for each congestion score, the timestamp of the last packet with a congestion notification and a vector of weighted congestion scores for the controller may be stored. The vector of weighted congestion scores may be taken from the record of the congestion score for each controller.

Given a controller i and a CoS/priority p, the cumulative congestion score of associated controllers at the initiator level may be calculated as $M_c[C_i] \times V_p$: that is, the row in $M_C$ for the controller i, multiplied by the vector containing the congestion scores corresponding to the priority p (taken from the target-wide record). The vector containing the congestion scores may be defined as a function of the weighted congestion scores and a measure of how long ago the last congestion notification was received: $V_p = wc_p \odot f(tcn_p)$, where $$f(tcn_p) = \forall\, i \in m \begin{cases} 1, (t_{now} - tcn_{i,p}) < 3 \text{ seconds} \\ 0, (t_{now} - tcn_{i,p}) \geq 3 \text{ seconds} \end{cases},$$

where $0 \leq i < m$, where m is the number of controllers. $\odot$ may be the Hadamard product, where each element of one vector is multiplied by the corresponding element in the second vector to create another vector of the same dimension. The function $f(tcn_p)$ may produce a vector including m components, where each element will be a 0 or 1 depending on whether the latest congestion notification timestamp for that controller is occurred in the past three seconds. Thus, the function $f(tcn_p)$ may be used to effectively limit calculating the weighted congestion score to periodic intervals. (Alternatively, $V_p$ may be expressed as a vector where the $i^{th}$ component $v_{i,p}$ is $$v_{i,p} = \begin{cases} wc_{i,p} \mid (t_{now} - tcn_{i,p}) < 3 \text{ seconds)} \\ 0 \mid (t_{now} - tcn_{i,p}) \geq 3 \text{ seconds)} \end{cases},$$

which represents the same concept without using the Hadamard product or function $f(tcn_p)$.)

The choice of three seconds in the above calculation is based on the TCP retransmit timeout, which is initially set to three seconds. The rationale behind the TCP retransmit timeout is that if there is a packet loss, TCP will become aware of that fact after three seconds. This TCP retransmit timer may be used when the transport protocol does not receive any ECN and determines that there has been a lost packet. During this three second interval, if an associated controller has received a congestion notification, the associated controller may take proactive measures to avoid congestion. But the use of three seconds as such an interval is merely an example, and other intervals may be used. Further, while the above example focuses on TCP as the protocol, embodiments of the disclosure may be used with other protocols, and may also use other intervals.

While the above discussion focuses on lossy fabrics, a similar timing may be used with a lossless fabric to reduce the back pressure.

Similarly, given a controller i and a CoS/priority p, the cumulative congestion score of associated controllers at the rack/cluster may be calculated as $M_{sys}[C_i] \times V_p$: that is, the row in $M_{Sys}$ for the controller i, multiplied by the vector containing the congestion scores corresponding to the priority p (taken from the target-wide record): $V_p$ may be calculated as described above.

As mentioned above, the mechanism may limit the applicability of congestion in associated queue pairs/controllers based on how long congestion is expected to remain. Congestion control may be applied for a period based on estimated transmission time, starting from the time the decision to apply congestion control was made. That is, congestion control may be applied for the amount of time it takes for the network protocol stack to recognize congestion and take action to correct the congestion. This amount of time may be estimated, for example, as the round trip time (the time it takes for a packet to travel from its source to its destination and for a response to be received back at the source) for the network. This period may depend on factors such as the level at which the congestion was observed (same host/multipath or rack/cluster level), the congestion score, and the average queueing delay across the network stack. The average queueing delay may be calculated as $$\frac{1}{\mu - \lambda},$$

where $\mu$ may represent the service rate (the rate at which packets are sent) and $\lambda$ may represent the packet arrival rate of packets at the network layer of the target's network stack. Put another way, $\lambda$ may represent the total number of packets per second coming from various controllers that needs to be sent out from the target to the various hosts. $\mu$ may be obtained from system profiling, and $\lambda$ may be estimated using the inputs from network statistics tools. During the time that congestion control is being applied, further congestion notifications might not be checked (although they may be checked and used to reset the period of time specified for congestion control). One approach to calculating this congestion control period may be $(T - Q_{delay}) \times f(C) \times g(L)$, where T may represent the round trip time, $Q_{delay}$ may represent the average queueing delay, $f(C)$ may represent a function of the congestion score (and may be used to determine what fraction of the time during which congestion control should be applied, based on the severity of the congestion), and g(L) may represent a function of the association level (as described above with reference to the controller associativity matrix $M_c$ and/or the system level associativity matrix $M_{Sys}$.

During congestion control, the NVMe payload in each protocol data unit (PDU) from affected queue pairs may be limited to the Maximum Segment Size (a value that may be set at the protocol layer). Multiple PDUs may be needed to send the entire payload from the affected queue pair, in which case the inter-PDU delay may be calculated as $$d = \frac{d_{total}}{n_{PDU}},$$

where $d_{total}$ may represent the length of the period during which congestion control may be applied for the queue pair and nPDu may represent the number of PDUs needed to send the entire payload: that is, for TCP (as an example)

$$n_{PDU} = \frac{\text{total payload size}}{MSS}.$$

More generally, the PDU may be expected to be no larger than the maximum transmission unit (MTU) of the network interface card.

In the above discussion, the focus is on congestion control at the target. But congestion control may also apply at the initiator. Congestion control at the initiator may not be as critical as congestion control at the target, since write commands (which may involve large amounts of data moving from the initiator to the target (may be less frequent than reads (which may involve large amounts of data moving from the target to the initiator), and the number of targets a host may use to write data simultaneously may be low compared with how many hosts may attempt to read from a target supports simultaneously. Targets may be identified based on their NVMe Qualified Name (NQNs) and the corresponding IP addresses.

Congestion control for reads at the target and for writes at the initiator may be managed independently. A network switch may have separate buffers for transmission and reception of data, so congestion during a read at the target end might not imply that there is congestion during a write from the initiator, or vice versa. In addition, when there are multitude of network paths, the series of switches traversed by a packet from target to initiator may not be the same as the series of switches traversed by a packet from initiator to target.

FIG. 1 shows a system including devices connected via a network, according to embodiments of the disclosure. In FIG. 1, devices 105-1 through 105-15 are shown, organized into three racks 110-1 through 110-3 and connected to form network 115. Embodiments of the disclosure may include any number of devices, organized into any number of racks. In addition, while FIG. 1 shows five devices in each of racks 110-1 through 110-3, embodiments of the disclosure may have any number (one or more) of racks, and different racks may include different numbers of devices.

Devices 105-1 through 105-15 may be any type of devices that may be used with racks 110-1 through 110-3. Examples of devices 105-1 through 105-15 may include, without limitation, storage devices, network interface cards, processors, accelerators, etc. In the discussion below, some of devices 105-1 through 105-15 may be thought of as storage devices accessible across network 115.

Racks 110-1 through 110-3 may include switches 120-1 through 120-6. Switches 120-1 through 120-6 may be termed top-of-rack switches, because they sit at the "top" of the rack and connect to the devices in the rack. For example, switches 120-1 and 120-2 connect to devices 105-1 through 105-5, switches 120-3 and 120-4 connect to devices 105-6 through 105-10, and switches 120-5 and 120-6 connect to devices 105-11 through 105-15. Note that switches 120-1 through 120-6 may provide multiple connections to devices 105-1 through 105-15: for example, device 105-1 is connected to both of switches 120-1 and 120-2 (although device 105-1 may be connected to switches 120-1 and 120-2 through different ports, as discussed below with reference to FIG. 2). While FIG. 1 shows racks 110-1 through 110-3 each with two switches, and that switches 120-1 through 120-6 are each connected to all devices in the corresponding racks, embodiments of the disclosure may include any number (one or more) of switches in a rack (and different numbers of switches in different racks), and that the switches in a rack might not connect to all devices in the rack.

In addition to switches 120-1 through 120-6 in racks 110-1 through 110-3, network 115 may include switches 120-7 and 120-8. Switches 120-7 and 120-8 may interconnect switches 120-1 through 120-6, thus providing one or more paths that interconnect devices 105-1 through 120-15, even if in different racks.

Although the term switch is used herein, the term switch should be understood to include other intermediary elements that may perform similar functions. Thus, the term switch should be understood to include other elements such as routers, gateways, etc.

The topology shown in FIG. 1 may be termed a leaf spine topology (sometimes termed a spine-leaf topology or a leaf-and-spine topology): switches 120-7 and 120-8 may be thought of as the spine of network 115, and switches 120-1 through 120-6 may be thought of as the leaves of network 115 (to which devices 105-1 through 105-15 may connect). As may be seen, any two devices in network 115 may be connected through one or three of switches 120-1 through 120-8: one switch if both devices are in the same rack and connected to the same top-of-rack switch, and three switches otherwise. (If both top-of-rack switches in the same rack—such as switches 120-1 and 120-2—are connected to each other, then devices in that rack may be connected using two switches as well.) While FIG. 1 shows network 115 arranged in a leaf spine topology, embodiments of the disclosure may extend to any desired topology.

While FIG. 1 implies that network 115 is a local area network (LAN) such as may be used to interconnect devices 105-1 through 105-15, as may occur within a datacenter, network 115 may extend to other forms of networks, such wide area networks (WANs), metropolitan area networks (MANs), and global networks, such as the Internet. However, as discussed below, the benefits of embodiments of the disclosure may be greater in networks with fewer number of paths between devices the network.

In the remainder of this document, any reference to an element of the drawings will use a generic reference number. For example, any reference to "device 105" may be understood to be a reference to any of devices 105-1 through 105-15, any reference to "rack 110" may be understood to be a reference to any of racks 110-1 through 110-3, and any reference to "switch 120" may be understood to be a reference to any of switches 120-1 through 120-8.

Rack 110 may include also include various other components not shown in FIG. 1. For example, rack 110 may include one or more processors and/or memory, which may be used in managing the functions of rack 110 (rather than necessarily being accessible across network 115). Such processors may be any variety of processor. Each of these processors may be single core or multi-core processors, each of which may implement a Reduced Instruction Set Computer (RISC) architecture or a Complex Instruction Set Computer (CISC) architecture (among other possibilities), and may be mixed in any desired combination. The memory may be any variety of memory, such as flash memory, Dynamic Random Access Memory (DRAM), Static Random Access Memory (SRAM), Persistent Random Access Memory, Ferroelectric Random Access Memory (FRAM), or Non-Volatile Random Access Memory (NVRAM), such as Magnetoresistive Random Access Memory (MRAM) etc. The memory may also be any desired combination of different memory types, and may be managed by a memory controller. The processor and memory may also support an operating system under which various applications may be running. These applications may issue requests (which may also be termed commands) to read data from or write data to the memory or to devices 105.

Figure 2:
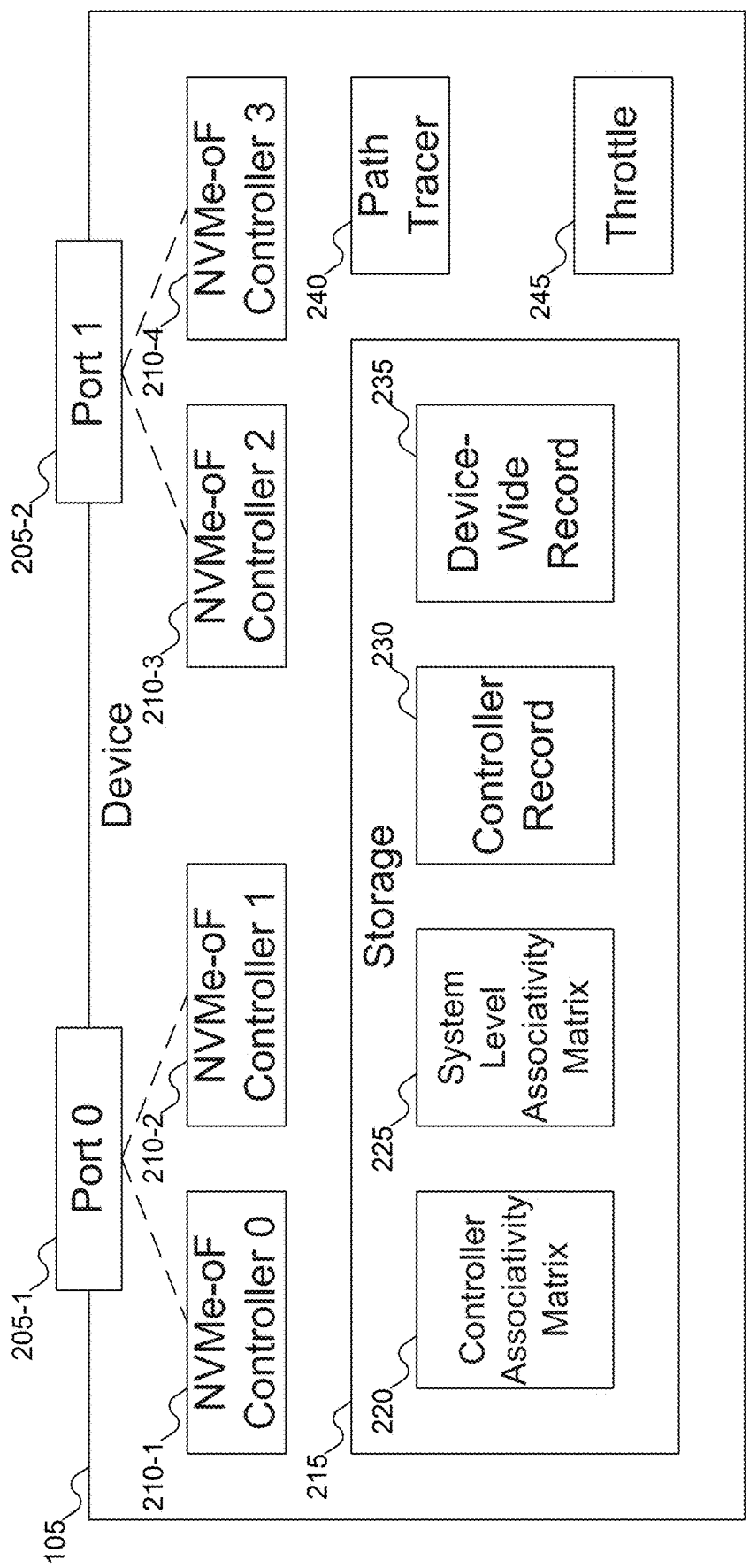
FIG. 2 shows details of the devices of FIG. 1, according to embodiments of the disclosure.

FIG. 2 shows details of devices 105 of FIG. 1, according to embodiments of the disclosure. In FIG. 2, device 105 is shown. Device 105 may include ports 205-1 and 205-2, through which device 105 may communicate with switches 120. For example, if device 105 is in rack 110-1 of FIG. 1, port 205-1 may connect device 105 to switch 120-1 of FIG. 1, and port 205-2 may connect device 105 to switch 120-2 of FIG. 1. While FIG. 2 shows device 105 as including two ports 205-1 and 205-2, embodiments of the disclosure may include any number (one or more) ports 205 to connect device 105 to switches 120. In addition, there does not need to be a correspondence between the number of ports 205 on device 105 and the number of top-of-rack switches 120 of FIG. 1 in rack 110 of FIG. 1: device 105 may include fewer or more ports 205 than the number of top-of-rack switches 120 of FIG. 1 in rack 110 of FIG. 1. (Of course, if device 105 includes more ports than the number of top-of-rack switches 120 of FIG. 1, then some ports may be left unused, and if device 105 includes fewer ports than the number of top-of-rack switches 120 of FIG. 1 in rack 110 of FIG. 1, then device 105 might not be connected to all top-of-rack switches 120 of FIG. 1 in rack 110 of FIG. 1.) Associated with each port 205 may be one or more controllers. In FIG. 2, device 105 is shown as a Non-Volatile Memory Express (NVMe) over Fabrics (NVMe-oF) device: thus, NVMe-oF controllers 210-1 and 210-2 may be associated with port 205-1, and NVMe-oF controllers 210-3 and 210-4 may be associated with port 205-2. While FIG. 2 shows two NVMe-oF controllers 210 associated with each port 205, embodiments of the disclosure may include any number (one or more) NVMe-oF controllers 210 associated with each port 205, and the number of NVMe-oF controllers 210 associated with each port 205 may differ. In addition, if device 105 supports protocol other than NVMe-oF for communicating across network 115 of FIG. 1, controllers 210 may be different types of controllers than NVMe-oF controllers.

Device 105 may also include storage 215, which may be used to store various information. The information stored in storage 215 may include controller associativity matrix 220, system level associativity matrix 225, controller record 230, and device-wide record 235. Controller associativity matrix 220, system level associativity matrix 225, controller record 230, and device-wide record 235 are discussed further with reference to FIGS. 9-12 below. While FIG. 2 shows storage 215 as a single storage that includes all of controller associativity matrix 220, system level associativity matrix 225, controller record 230, and device-wide record 235, embodiments of the disclosure may include two or more different storages that may store any desired subsets of controller associativity matrix 220, system level associativity matrix 225, controller record 230, and device-wide record 235. In addition, in embodiments of the disclosure where device 105 is a storage device, device 105 may include any number (one or more) of storage units (such as hard disk drives or Solid State Drives (SSDs)) that collectively form a single target: controller associativity matrix 220, system level associativity matrix 225, controller record 230, and device-wide record 235 may apply to device 105 as a unit, rather than to the individual storage units within device 105. But embodiments of the disclosure may include device 105 including multiple targets, and/or copies of controller associativity matrix 220, system level associativity matrix 225, controller record 230, and device-wide record 235 for different storage units.

Device 105 may also include path tracer 240 and throttle 245. Path tracer 240 may be used to trace a path used in communicating with another device 105 in network 115 of FIG. 1. Tools that may function as path tracer 240 may, for example, identify the network addresses of all switches 120 of FIG. 1 that connect device 105 with another device in network 115 of FIG. 1. These tools might operate from within device 105 or within other components of network 115 of FIG. 1—for example, switches 120 of FIG. 1—to capture the targeted information. In addition, path tracer 240 may be able to identify information such as the network addresses of the other device(s) with which device 105 may be communicating. As discussed below with reference to FIGS. 9-10, this information may be used in determining whether or not controllers 210-1 and 210-2 may be associated.

Throttle 245 may be used to control data sent over controller 210 that is being proactively controlled for congestion. That is, given that controller 210-1 is identified as congested as discussed below with reference to FIG. 7, controllers 210-2 through 210-4 may be proactively controlled to prevent congestion from occurring on these controllers. Throttle 245 may operate to limit the size of packets sent via controllers 210-2 through 210-4 or to limit the frequency with which packets may be sent. For example, if throttle 245 limits the size of packets, throttle 245 may limit packets to a maximum segment size (a parameter associated with the transmission control protocol (TCP)) or some other appropriate maximum transmission unit (MTU) which may be used in network communications. Or, if throttle 245 limits the frequency with which packets are sent, throttle 245 may determine an inter-packet delay, which may be calculated as the ratio of the amount of data to be sent over a given interval and the maximum size of each packet. Note that throttle 245 may apply multiple limits: limiting packet size and limiting packet frequency may be combined. By using such techniques, throttle 245 may prevent controllers 210-2 through 210-4 from experiencing congestion. Throttle 245 may apply proactive congestion control for any desired period. For example, throttle 245 may apply proactive congestion control for the amount of time needed for a round trip communication from device 105 to another device and back again: other periods may also be used. The period for which throttle 245 may apply proactive congestion control may factor in where the congestion occurred: at port 205, at some switch between device 105 and another device, a score reflecting the level of congestion experienced by controller 210-1, which is discussed further with reference to FIG. 11 below, and the average queueing delay, which may be expressed as $$\frac{1}{\mu - \lambda},$$

where $\mu$ may represent the service rate (the average rate at which packets are sent) and $\lambda$ may represent the average packet arrival rate.

Device 105 may also include other components not shown in FIG. 2, and which may depend on the function offered by device 105. For example, if device 105 is a storage device, then device 105 may also include storage (such as a hard disk drive or flash memory) and a controller to manage the reading and writing of data from the storage. If device 105 is a local processor or accelerator, then device 105 may include the circuitry and/or software to implement the supported functions.

Figure 3:
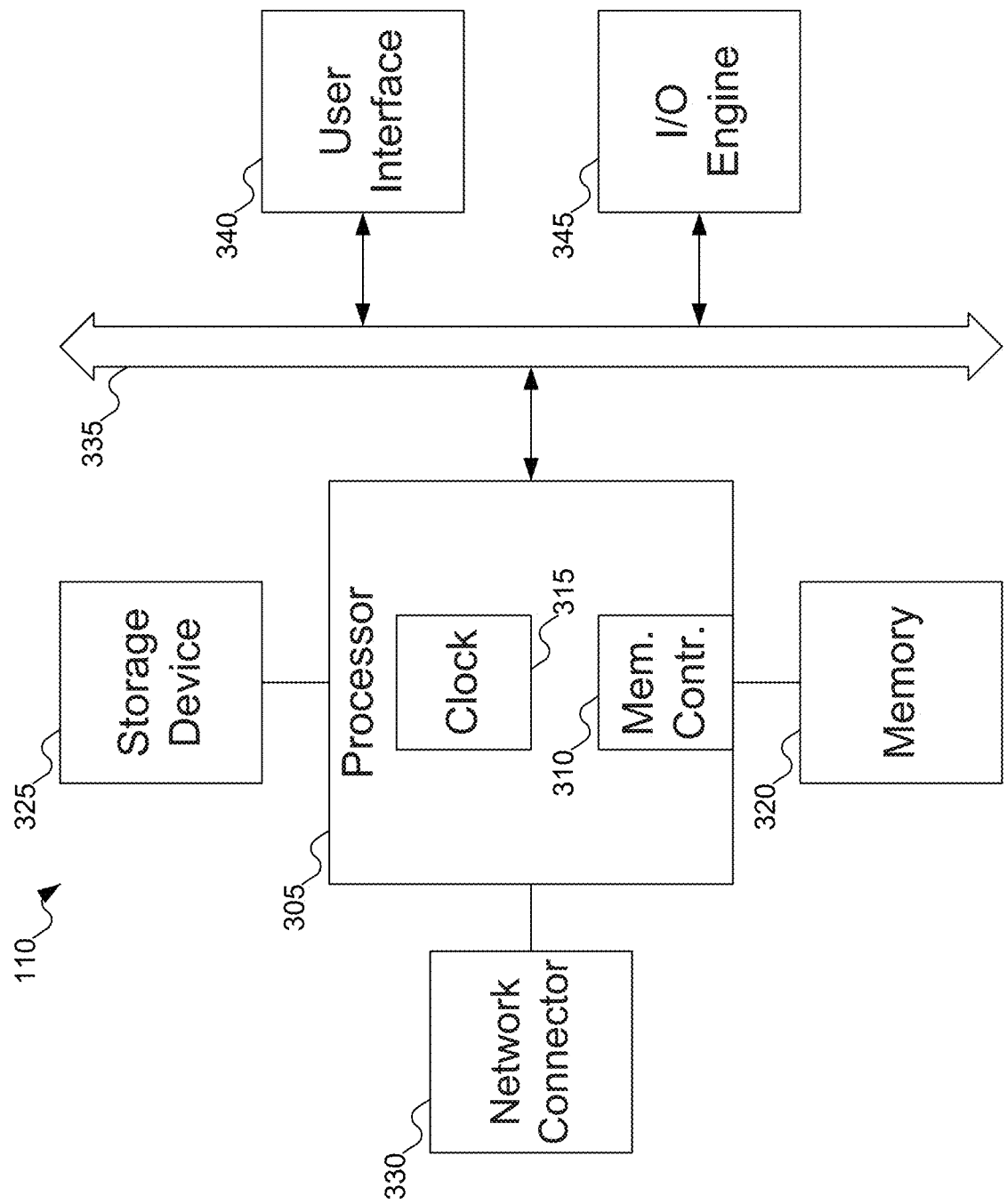
FIG. 3 shows details of the racks of FIG. 1, according to embodiments of the disclosure.

FIG. 3 shows details of racks 110 of FIG. 1, according to embodiments of the disclosure. In FIG. 3, typically, rack 110 includes one or more processors 305, which may include memory controllers 310 and clocks 315, which may be used to coordinate the operations of the components of the machine. Processors 305 may also be coupled to memories 320, which may include random access memory (RAM), read-only memory (ROM), or other state preserving media, as examples. Processors 305 may also be coupled to storage devices 325, and to network connector 330, which may be, for example, an Ethernet connector or a wireless connector. Processors 305 may also be connected to buses 335, to which may be attached user interfaces 340 and Input/Output (I/O) interface ports that may be managed using I/O engines 345, among other components.

Figure 4:
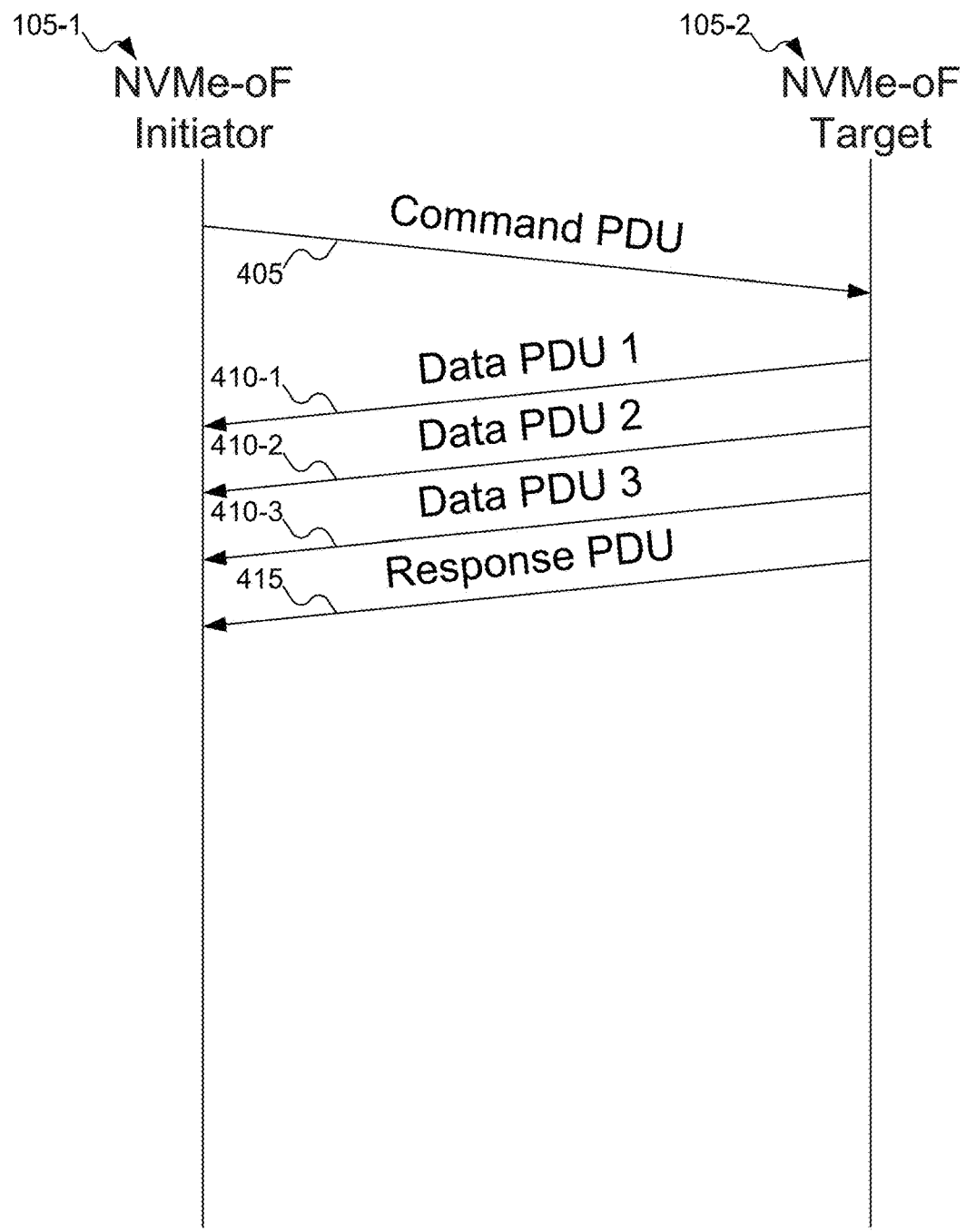
FIG. 4 shows a Non-Volatile Memory Express (NVMe) over Fabrics (NVMe-oF) initiator sending a command and an NVMe-oF target responding, according to embodiments of the disclosure.

FIG. 4 shows NVMe-oF initiator 105-1 of FIG. 1 sending a command and NVMe-oF target 105-2 of FIG. 1 responding, according to embodiments of the disclosure. In FIG. 4, NVMe-oF initiator 105-1 may send command protocol data unit (PDU) 405. NVMe-oF initiator 105-1 may also be termed a host. In response to this one command PDU 405, NVMe-oF target 105-2 may send multiple PDUs, including data PDUs 410-1 through 410-3, and response PDU 415. (While FIG. 4 shows NVMe-oF target 105-2 sending three data PDUs 410-1 through 410-3, embodiments of the disclosure may support any number of data PDUs sent by NVMe-oF target 105-2.) Thus, a single packet sent by one device 105 may result in multiple packets being sent by another device 105 in response.

As discussed above, device 105 may be an NVMe-oF device. While embodiments of the disclosure may include devices using other protocols, the NVMe-oF protocol includes some characteristics that may enhance the benefit of embodiments of the disclosure.

Figure 5:
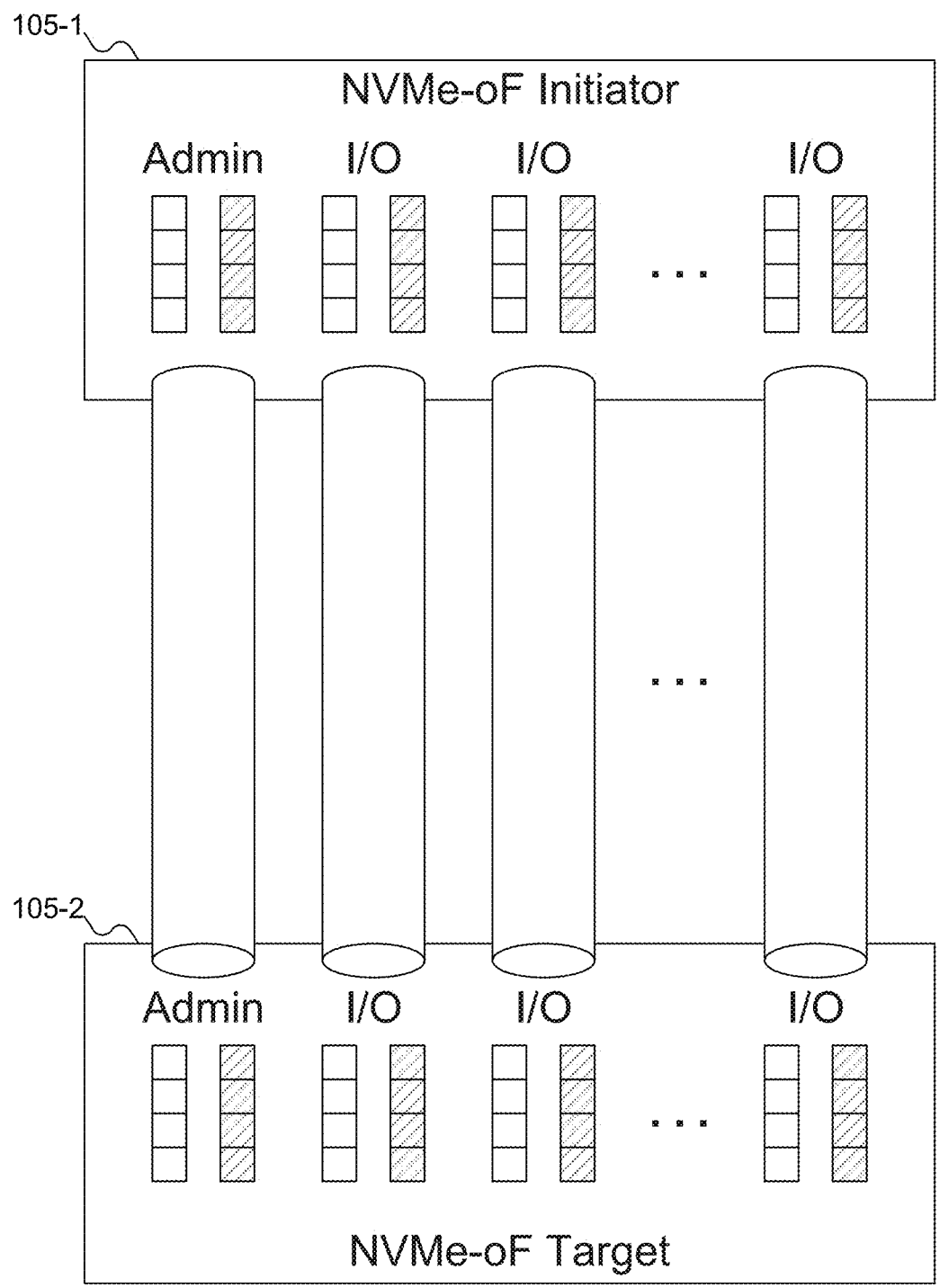
FIG. 5 shows the NVMe-oF initiator of FIG. 4 communicating with the NVMe-oF target of FIG. 4 in the system of FIG. 1, according to embodiments of the disclosure.

In FIG. 5 an NVMe-oF initiator is shown communicating with an NVMe-oF target in the system of FIG. 1, according to embodiments of the disclosure. As the terms imply, an NVMe-oF initiator may be an NVMe-oF device that initiates a request of an NVMe-oF device (the NVMe-oF target). Using NVMe-oF, NVMe-oF initiator 105-1 and NVMe-oF target 105-2 may each have a number of queue pairs (each queue pair may include a submission queue to receive packets and a completion queue to send packets). There may be one (or more) queue pair used for administrative purposes, and one (or more) queue pair used for input/output (I/O) purposes.

When a connection is established between NVMe-oF initiator 105-1 and NVMe-oF target 105-2, NVMe-oF initiator 105-1 and NVMe-oF target 105-2 each use a particular queue pair, as represented by the "tunnels" (which may include communication via, for example, TCP) connecting queue pairs. When a communication is sent via a particular queue pair, the NVMe-oF protocol expects that the response will be sent using the same queue pair. This expectation has the effect of preventing NVMe-oF initiator 105-1 and NVMe-oF target 105-2 from being able to use alternate paths to communicate: communications between them are expected to follow the same path.

Figure 6:
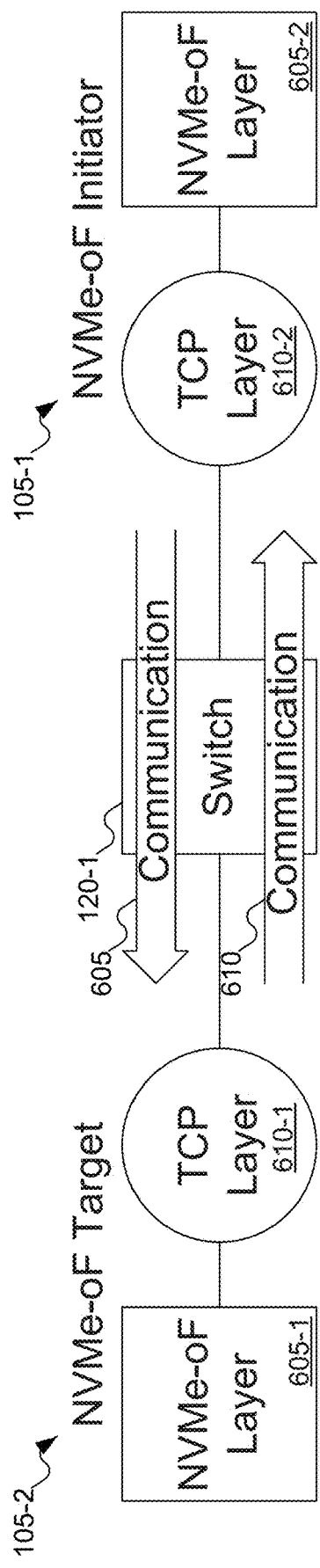
FIG. 6 shows an alternative view of the NVMe-oF target and the NVMe-oF initiator of FIG. 5 communicating, according to embodiments of the disclosure.

FIG. 6 helps to illustrate this point. In FIG. 6, NVMe-oF initiator 105-1 and NVMe-oF target 105-2 are communicating. NVMe-oF initiator 105-1 and NVMe-oF target 105-2 may include NVMe-oF layers 605-1 and 605-2, respectively, and TCP layers 610-1 and 610-2, respectively. NVMe-oF layers 605-1 and 605-2 may be use to pack/unpack data using the NVMe-oF protocol, and TCP layers 610-1 and 610-2 may be used to pack/unpack data using the TCP protocol. Whichever switch, such as switch 120-1, that might be along the path used for communication to send a packet between NVMe-oF initiator 105-1 and NVMe-oF target 105-2, that switch may be expected to be part of the path used communication of any other packets between NVMe-oF initiator 105-1 and NVMe-oF target 105-2.

If switch 120-1 between NVMe-oF initiator 105-1 and NVMe-oF target 105-2 (or, in a similar manner, port 205 of FIG. 2 on NVMe-oF initiator 105-1 or NVMe-oF target 105-2) is congested, then that congestion may affect other communications that travel through that switch/port. When the leaf spine topology, which may provide for a limited number of paths between NVMe-oF initiator 105-1 and NVMe-oF target 105-2 (particularly if communications may not be switched to other ports of devices 105) is also considered, congestion in switch 120-1 (or port 205 of FIG. 2) may affect other traffic using that same switch 120-1 (or port 205 of FIG. 2). These considerations may be compared with other network protocols, which may permit traffic to travel via alternate paths, or other network topologies that may offer more paths through network 115 of FIG. 1, and which may make embodiments of the disclosure potentially less effective (since it may be less likely that congestion at a particular point within network 115 of FIG. 1 may impact other communications that might traverse that point).

Figure 7:
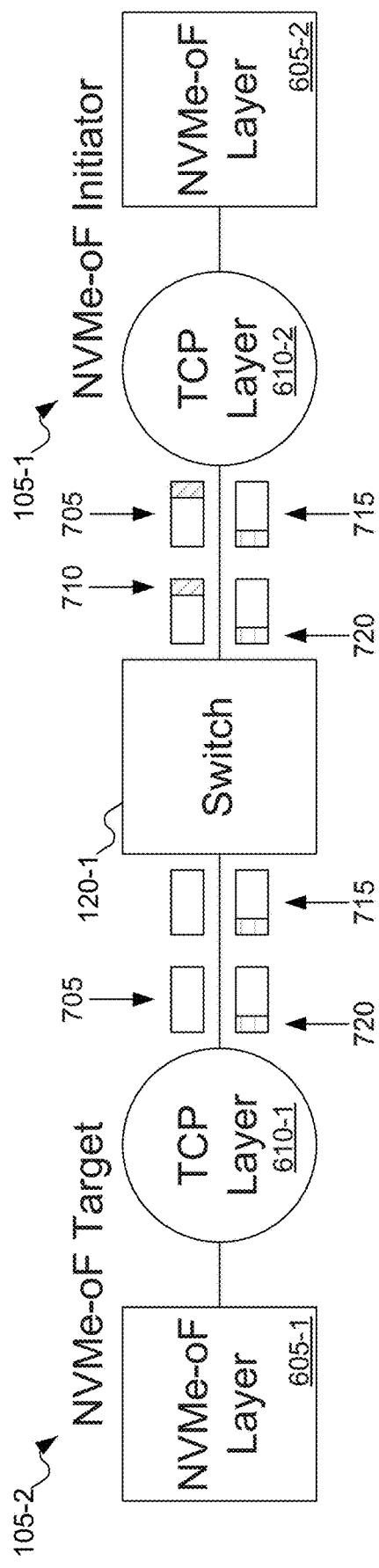
FIG. 7 shows a switch marking a packet with a congestion notification in the communications between the NVMe-oF target and the NVMe-oF of FIG. 5, according to embodiments of the disclosure.

But to understand the benefits of proactive congestion control, it is helpful to understand how congestion control may otherwise be applied. FIG. 7 shows switch 120-1 implementing a scheme, such as explicit congestion notification (ECN): embodiments of the disclosure may support other congestion notification schemes other than ECN.

NVMe-oF target 105-2 may send data intended for NVMe-oF initiator 105-1, shown as packets 705. (NVMe-oF target 105-2 is shown as sending the data in FIG. 7 because read operations may be more frequent than write operations in network 115 of FIG. 1, and therefore congestion may more likely arise when NVMe-oF target 105-2 is attempting to return data to NVMe-oF initiator 105-1 in response to a read command. But embodiments of the disclosure are equally applicable to NVMe-oF initiator 105-1 sending write data to NVMe-oF target 105-2.)

In ECN, when switch 120-1 determines that there is congestion at switch 120-1, switch 120-1 may set a bit in the packets, shown as congestion notification 710 in the packets being sent from switch 120-1 to NVMe-oF initiator 105-1. Upon receiving packets 705 with congestion notification 710, NVMe-oF initiator 105-1 may send acknowledgement packets 715 back to NVMe-oF target 105-2: acknowledgement packets 715 may include an echo of the congestion notification, shown as congestion notification echo 720.

But as may be seen from this explanation, NVMe-oF target 105-2, which is sending the data, is not made aware of the congestion until NVMe-oF target 105-2 receives congestion notification echo 720 from NVMe-oF initiator 105-1. In the interim, NVMe-oF target 105-2 may have sent more data, which may exacerbate the congestion at switch 120-1, and which might lead to congestion for other communications passing through switch 120-1.

Once NVMe-oF target 105-2 receives congestion notification echo 720, NVMe-oF target 105-2 may take action to help reduce the congestion in the communication between NVMe-oF target 105-2 and NVMe-oF initiator 105-2: such action may include reducing the amount of data sent by NVMe-oF target 105-2, or the frequency with which data is sent from NVMe-oF target 105-2. But to further help address this situation, and to reduce the likelihood that other traffic passing through switch 120-1 may become congested, embodiments of the disclosure may involve NVMe-oF target 105-2 considering whether proactive congestion control should be applied to other communications passing through switch 120-2. It may not be possible for a device, such as NVMe-oF target 105-2, to recognize congestion as a result of traffic between other devices in network 115 of FIG. 1, but NVMe-oF target 105-2 may be able to take proactive congestion control based on congestion identified in another connection involving NVMe-oF target 105-2. FIGS. 8-12 describe how this identification may be performed.

Figure 8:
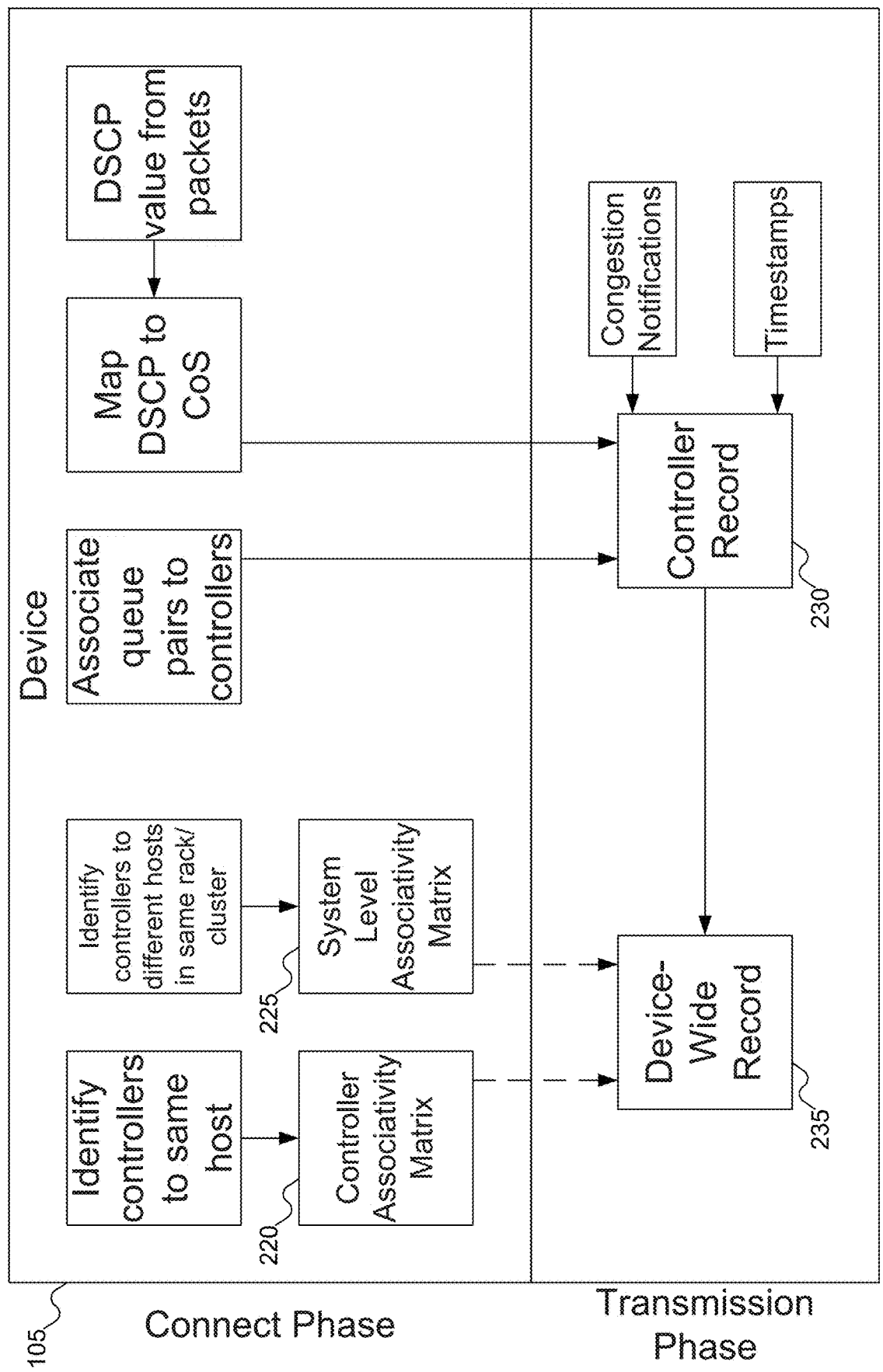
FIG. 8 shows the device of FIG. 1 assembling information for proactive congestion control, according to embodiments of the disclosure.

FIG. 8 shows devices 105 of FIG. 1 assembling information for proactive congestion control, according to embodiments of the disclosure. In FIG. 8, device 105 may operate in two different phases. In the first phase, called the connect phase, device 105 may identify controllers 210 of FIG. 2 communicating with the same host. Such controllers 210 of FIG. 2 may be said to be controller associated, and controller associativity matrix 220 may be used to identify which controllers 210 of FIG. 2 are so associated. In addition, in some embodiments of the disclosure two controllers communicating across the same port 205 of FIG. 2, whether communicating with the same host or with different hosts, may also be said to be associated, and marked as such in controller associativity matrix 220.

Device 105 may also identify controllers 210 of FIG. 2 that are communicating with different hosts, but the different hosts are in the same rack or cluster. Such controllers 210 of FIG. 2 may be said to be system associated, and system level associativity matrix 225 may be used to identify which controllers 210 of FIG. 2 are so associated.

Note that after all controllers 210 of FIG. 2 that are communicating using the same port 205 of FIG. 2, that are communicating with the same host, or are communicating with a host in the same rack or cluster have been identified, all that remains are controllers 210 of FIG. 2 that are communicating with different hosts that are in different racks or clusters. Such controllers 210 of FIG. 2 are not associated with any other controllers 210 of FIG. 2.

From packets used in establishing the communication with the host, device 105 may extract a differentiated services field codepoint (DSCP), which may provide some information regarding the priority or Class of Service (CoS) for the communication. For example, in some embodiments of the disclosure DSCP values may range from 0-63, and which may be mapped to CoS values by a switch. In some embodiments of the disclosure, CoS may range from 0 to 5, with 0 representing the lowest CoS and 5 representing the highest CoS; other embodiments of the disclosure may use other values, which might or might not include consecutive integer values. In other embodiments of the disclosure, the CoS for the communication with the host may be determined using a Virtual Local Area Network (VLAN) packet: the CoS value may be determined from the Priority Code Point (PCP) of the VLAN packet.

The CoS information, combined with the queue pairs associated with the communication, may be used to update controller record 230. Note that while controller associativity matrix 220 and system level associativity matrix 225 are set during the connect phase and then might not change (until either a new connection is established or an old connection is ended), controller record 230 may be updated during communication with the host. Thus, controller record 230 may be considered to be part of the transmission phase.

As just stated, controller record 230 may be updated during communication. Specifically, controller record 230 may be updated with information regarding packets delivered to device 105 as part of the communication. This information may include, for example, updating timestamps when packets arrive that are marked with a congestion notification and when packets arrive that are normal (that is, packets that are not marked with a congestion notification).

In addition, when a packet arrives that is marked with a congestion notification, a congestion score for that queue pair may be determined. Controller record 230, controller associativity matrix 220, and system level associativity matrix 225, may then be used to determine information in device-wide record 235, which may then determine whether or not an associated controller should be subject to proactive congestion control.

FIG. 9 shows details of controller associativity matrix 220 of FIG. 2, according to embodiments of the disclosure. In FIG. 9, controller associativity matrix 220 is shown as a matrix, correlating different controllers in device 105 of FIG. 1. A value of 1 may indicate that two controllers 210 of FIG. 2 are associated, and a value of 0 may indicate that two controllers 210 of FIG. 2 are not associated. Embodiments of the disclosure may use any values to indicate associativity or not: the values 1 and 0 are merely examples.

Any two controllers 210 of FIG. 2 that are communicating with the same host may be marked as associated in controller associativity matrix 220. And in some embodiments of the disclosure, two controllers 210 of FIG. 2 that are using the same port 205 of FIG. 2 may also be marked as associated in controller associativity matrix 220.

Note that associativity in controller associativity matrix 220 is symmetric, commutative, and transitive. Symmetry means that any controller 210 of FIG. 2 may be associated with itself: all the entries along the main diagonal of controller associativity matrix 220 may be 1. Symmetry may matter, since a particular controller 210 of FIG. 2 may include more than one queue pair, and congestion on one queue pair might or might not influence the possibility of congestion on another queue pair in that controller. Commutativity means that if controller 1 is associated with controller 2, then controller 2 is necessarily associated with the controller 1. Commutativity may be seen in that controller associativity matrix 220 may be symmetric around the main diagonal. Finally, transitivity means that if controller 1 is associated with controller 2, and controller 2 is associated with controller 3, then controller 1 is also associated with controller 3. Transitivity may be seen in that for any two controllers that are associated, the rows and columns representing those controllers may be identical.

FIG. 10 shows details of system level associativity matrix 225 of FIG. 2, according to embodiments of the disclosure. In FIG. 10, system level associativity matrix 225 is shown as a matrix, correlating different controllers in device 105 of FIG. 1. A value of 1 may indicate that two controllers 210 of FIG. 2 are associated, and a value of 0 may indicate that two controllers 210 of FIG. 2 are not associated. Embodiments of the disclosure may use any values to indicate associativity or not: the values 1 and 0 are merely examples.

Any two controllers 210 of FIG. 2 that are communicating with hosts in the same rack or cluster may be marked as associated in system level associativity matrix 225. Note that in FIG. 10 it may be concluded that the two controllers 210 of FIG. 2 are communicating with different hosts, since otherwise the hosts would not be in different racks/clusters.

Like controller associativity matrix 220 of FIG. 9, associativity system level associativity matrix 225 may be symmetric and commutative: however, associativity in system level associativity matrix 225 is not necessarily transitive. For example, returning temporarily to FIG. 1, consider the situation where device 105-1 may be communicating with device 105-6 via switches 120-1, 120-7, and 120-3, device 105-1 may be communicating with device 105-11 via switches 120-1, 120-8, and 120-5, and device 105-7 may be communicating with device 105-12 via switches 120-4, 120-8, and 120-5. Switch 120-1 is used in the first and second paths of communication, and switches 120-8 and 120-5 are both used in the second and third paths of communication. But there are no ports or switches in common between the first and third paths of communication. Thus, while the first and second paths of communication may be associated, and the second and third paths of communication may be associated, the first and third paths of communication are not associated, and so system level associativity matrix 225 of FIG. 10 is not transitive.

While FIG. 10 shows system level associativity matrix 225 as using only values of 1 and 0, embodiments of the disclosure may support fractional values as well. Fractional values may be used to represent the degree of associativity. For example, counting all of the ports and switches used in a path of communication, the number of ports and/or switches in common may be divided by the number of ports and/or switches in each path of communication individually (or the number of ports and/or switches in the path of communication with the greater number of such components, if the paths differ in the number of components). So, continuing the example above that demonstrated that system level associativity matrix 225 is not transitive, since the first and second paths each include five components (two ports and three switches each) and the first and second paths have one component (switch 120-1) in common, system level associativity matrix 225 may reflect this degree of associativity as $1\pm5=0.2$; similarly, the degree of associativity of the second and third paths may be calculated as $2\pm5=0.4$. In such embodiments of the disclosure, the degree of associativity reflected in system level associativity matrix 225 may span any desired range, and is not necessarily limited to values between 0 and 1; however, it is useful for one end of this range to correspond to the value that represents no associativity and for the other end of this range to correspond to the value that represents maximum associativity.

FIG. 11 shows details of controller record 230 of FIG. 2, according to embodiments of the disclosure. In FIG. 11 controller record 230 is shown as a matrix. But unlike controller associativity matrix 220 of FIG. 9 or system level associativity matrix 225 of FIG. 10, controller record 230 stores information about given queue pair governed by a particular controller, and may not correlate information about these queue pairs. Instead, controller record 230 may store information such as the CoS associated with each queue pair, the weighted congestion score for each queue pair, the timestamp when the last packet was received that was marked with a congestion notification, and the timestamp when the last packet was received that was not marked with a congestion notification. In FIG. 11, controller record 230 is shown as storing information about n queue pairs: in embodiments of the disclosure, the number of queue pairs managed for a particular controller may vary depending on the controller. Note that since controller record 230 stores information about queue pairs associated with a particular controller and there may be any number of controllers 210 of FIG. 2 in device 105 of FIG. 1, there may be one controller record 230 for each controller 210 of FIG. 2 in device 105 of FIG. 1. Alternatively, if controller record 230 may identify the queue pair and the controller associated with the queue pair, then only one controller record 230 may be stored.

Of the data stored in controller record 230, the weighted congestion score is worth particular discussion. The weighted congestion score is intended to represent how congested that particular queue pair is, as well as how likely it is that congestion on that queue pair may affect other controllers. The weighted congestion score may be initially set as a constant (when the first packet marked with a congestion notification arrives). If subsequent packets arrive that are also marked with a congestion notification, this fact may represent that that queue pair is experiencing congestion that is not necessarily affecting other queue pairs in that controller. Thus, as subsequent packets arrive that are also marked with a congestion notification, the congestion score may be weighted by the inverse of the number of packets received for that queue pair that are marked with a congestion notification. Mathematically, the weighted congestion score may be calculated as $$\frac{K}{p},$$

where K may represent the constant used to initially set the congestion score, and p may represent the number of packets received for that queue pair that are marked with a congestion notification.

Regarding the other data stored in controller record 230, the congestion and uncongested timestamps are, as discussed above, the timestamps within device 105 of FIG. 1 when the most recent packets were received with and without a congestion notification, respectively. The CoS may depend on the connection with the host, and may change over time: a single controller may use a different CoS for different connections over time, and may be set by the host or switch (although in some embodiments of the disclosure the target may set the CoS). (But in some embodiments of the disclosure, the CoS assigned to the queue pair may be fixed for the duration of the connection to that host.) Note that different queue pairs may be assigned the same CoS: this fact may be expected if controller 210 of FIG. 2 supports more queue pairs than classes of service. In other words, there is no correlation between the number of classes of service and the number of queue pairs.

In some embodiments of the disclosure, information in controller record 230 may be kept forever, with new information being added as time passes. But over time, information about congestion that occurred in the past becomes less and less relevant, and at some point may be irrelevant to managing congestion now. Thus, in some embodiments of the disclosure, device 105 of FIG. 1 may track how long information in controller record 230 has been present. In particular, device 105 of FIG. 1 may track how much time has passed since controller record 230 was first updated to reflect that a packet marked with a congestion notification was received. After this interval has passed (which might be measured by setting a timer, or by tracking the timestamp that first packet marked with a congestion notification was received and comparing that time with the current time, and may span any desired amount of time, such as 10 minutes, 30 minutes, an hour, etc.), controller record 230 may be erase the information for a particular queue pair or for all queue pairs in controller 210 of FIG. 2, discarding the weighted congestion score and the timestamps for one or more queue pairs, as well as the number of packets marked with a congestion notification for the queue pair (note that the CoS may remain, since the CoS might not change until the connection with the host is ended). In some embodiments of the disclosure, this tracking of the first packet marked with a congestion notification may occur at the device-level, rather than at the controller level: once the interval has passed, controller record 230 for all controllers 210 of FIG. 2 may be erased. Note that this interval for tracking congestion may differ from the period during which proactive congestion control may be apply by throttle 245 of FIG. 2.

But if controller record 230 is erased in this manner and a queue pair had just experienced congestion, erasing controller record 230 might cause that controller 210 of FIG. 2 or other controllers 210 of FIG. 2 to miss an opportunity for proactive congestion control when such action might be beneficial. In such situations, where the most recent packet marked with a congestion notification is within some delta of the end of the interval, the number of packets marked with a congestion notification (that is, the weight) may be reset to 1 rather than 0 (the unweighted congestion score may remain the constant K). In that manner, associated controllers may still apply proactive congestion control if appropriate, even after the end of the interval. This delta may be measured as a percentage of the interval (for example, 5%) or a measured amount of time (for example, 2 minutes).

FIG. 12 shows details of device-wide record 235 of FIG. 2, according to embodiments of the disclosure. In FIG. 12, device-wide record 235 is shown as a matrix. Like controller record 230, and unlike controller associativity matrix 220 of FIG. 9 or system level associativity matrix 225 of FIG. 10, device-wide record 235 stores information about controllers, but without correlating information about the controllers. Instead, device-wide record 235 may store information about congestion relating to each controller as a whole.

In device-wide record 235, for each controller and for each CoS, the timestamp of the most recently received packet marked with a congestion notification and the weighted congestion score may be extracted from controller record 230 of FIG. 11 for that controller. That is, for a given controller 210 of FIG. 2, the corresponding controller record 230 of FIG. 11 may be identified. Then for a given CoS, each queue pair in controller record 230 of FIG. 11 may be examined to identify its CoS: only queue pairs with the CoS of interest are considered (with other queue pairs may be considered for other CoSs). Across the queue pairs with the CoS of interest, the timestamp of the most recently received packet marked with a congestion notification may be copied into device-wide record 235, along with the weighted congestion score from that same queue pair. Note that the weighted congestion scores from other queue pairs with older congestion timestamps may be ignored, as discussed above in the expression $V_p = wc_p \odot f(tcn_p)$, where $$f(tcn_p) = \forall\, i \in m \begin{cases} 1, (t_{now} - tcn_{i,p}) < 3 \text{ seconds} \\ 0, (t_{now} - tcn_{i,p}) \geq 3 \text{ seconds} \end{cases}.$$

In some embodiments of the disclosure, the congestion timestamp and the uncongested timestamp from controller record 230 of FIG. 11 may be compared, with only queue pairs with a congestion timestamp that is more recent than an uncongested timestamp (if the queue pair has a more recent uncongested timestamp, then the queue pair is no longer considered congested). This process may be repeated with each controller record 230 of FIG. 11 and with each CoS until device-wide record 235 is complete. Note that the weights may be reset periodically: this interval of weight reset may be any desired interval and may or may not correlate with any other interval used in other calculations.

Note that updating device-wide record 235 may be accomplished when an individual controller record 230 of FIG. 11 is updated for controller 210 of FIG. 2. That is, if a congestion timestamp in controller record 230 of FIG. 11 is updated to a more recent time, and/or a weighted congestion score in controller record 230 of FIG. 0.11 is updated, that information may also be used to update device-wide record 235. Similarly, if a queue pair receives an uncongested packet and updates the uncongested timestamp to be more recent than the congestion timestamp, that information may be used to update device-wide record 235 (since the queue pair that is no longer congested might have provided the weighted congestion score used for that controller and that CoS in device-wide record 235)

Once device-wide record 235 is updated, and controller associativity matrix 220 of FIG. 9 and system level associativity matrix 225 of FIG. 10 are prepared (which should happen during the connect phase and therefore should happen before device-wide record 235 is updated), a particular controller may use all of this data to determine whether to proactively apply congestion control. Specifically, for a particular controller 210 of FIG. 2, the rows in controller associativity matrix 220 of FIG. 9 and system level associativity matrix 225 of FIG. 10 corresponding to that particular controller 210 of FIG. 2 may be multiplied by a vector of weighted congestion scores from device-wide record 235 for a particular CoS (this vector may factor in how recent the congestion notification was received, and therefore may omit some non-zero congestion scores from device-wide record 235).

Mathematically, given a particular priority of interest, the column from device-wide record 235 containing the weighted congestion scores may be extracted and formed into a column vector (this vector may omit the timestamp information), which may be termed $V_p$, where p is the CoS of interest. Then, if $M_C[C_i]$ may represent the row from controller associativity matrix 220 of FIG. 9 for the particular controller 210 of FIG. 2 and if $M_{Sys}[C_i]$ may represent the row from system level associativity matrix 225 of FIG. 10 for the particular controller 210 of FIG. 2, then $M_C[C_i] \times V_p$ and $M_{sys}[C_i] \times V_p$ may respectively represent estimated congestion scores for that particular controller 210 of FIG. 2 for that particular CoS. Vector multiplication involves multiplying corresponding values and summing the products. Mathematically, this may be expressed as $$[r_1 \; r_2 \; r_3 \; \ldots \;] \times \begin{bmatrix} c_1 \\ c_2 \\ c_3 \\ \vdots \end{bmatrix} = \sum_i (r_i \times c_i).$$

These estimated congestion scores may be compared with a threshold (each of these estimated congestion scores may be compared with the same threshold or with different thresholds): if the estimated congestion scores are higher than the appropriate threshold, that controller 210 of FIG. 2 may proactively apply congestion control. Any threshold value(s) may be used, as desired: in some embodiments, lower threshold values may reflect a greater concern about congestion, and higher threshold values may reflect a lesser concern about congestion. For example, a threshold value of 5 may reflect a greater tolerance for congestion than a threshold value of 2. In some embodiments of the disclosure, each controller may have its own threshold value(s); in other embodiments of the disclosure, the threshold values may be used in determining whether or not to apply proactive congestion control for all controllers 210 of FIG. 2.

Note that in the above discussion CoS is factored into the selection of the values for $V_p$. By factoring in CoS, a particular controller 210 of FIG. 2 may manage queue pairs associated with that controller differently, depending on each queue pair's CoS. That is, some queue pairs might have proactive congestion control; other queue pairs might not have proactive congestion control. But in some embodiments of the disclosure, device-wide record 235 may include a single weighted congestion score (and congestion timestamp) applicable to all priorities: a particular controller 210 of FIG. 2 might then apply proactive congestion control to all queue pairs associated with that particular controller 210 of FIG. 2, without considering CoS. In the above discussion, the congestion timestamp stored in device-wide record 235 was used to determine whether or not a particular congestion notification is recent enough to be considered as part of the weighted congestion score. In some embodiments of the disclosure, device 105 of FIG. 1 may ignore how recent a particular congestion notification is, and may use the congestion score regardless of whether or not the congestion notification was recent. In such embodiments of the disclosure, old congestion notifications may be eliminated from the weighted congestion score when the congestion score itself is cleared.

Figure 13A:
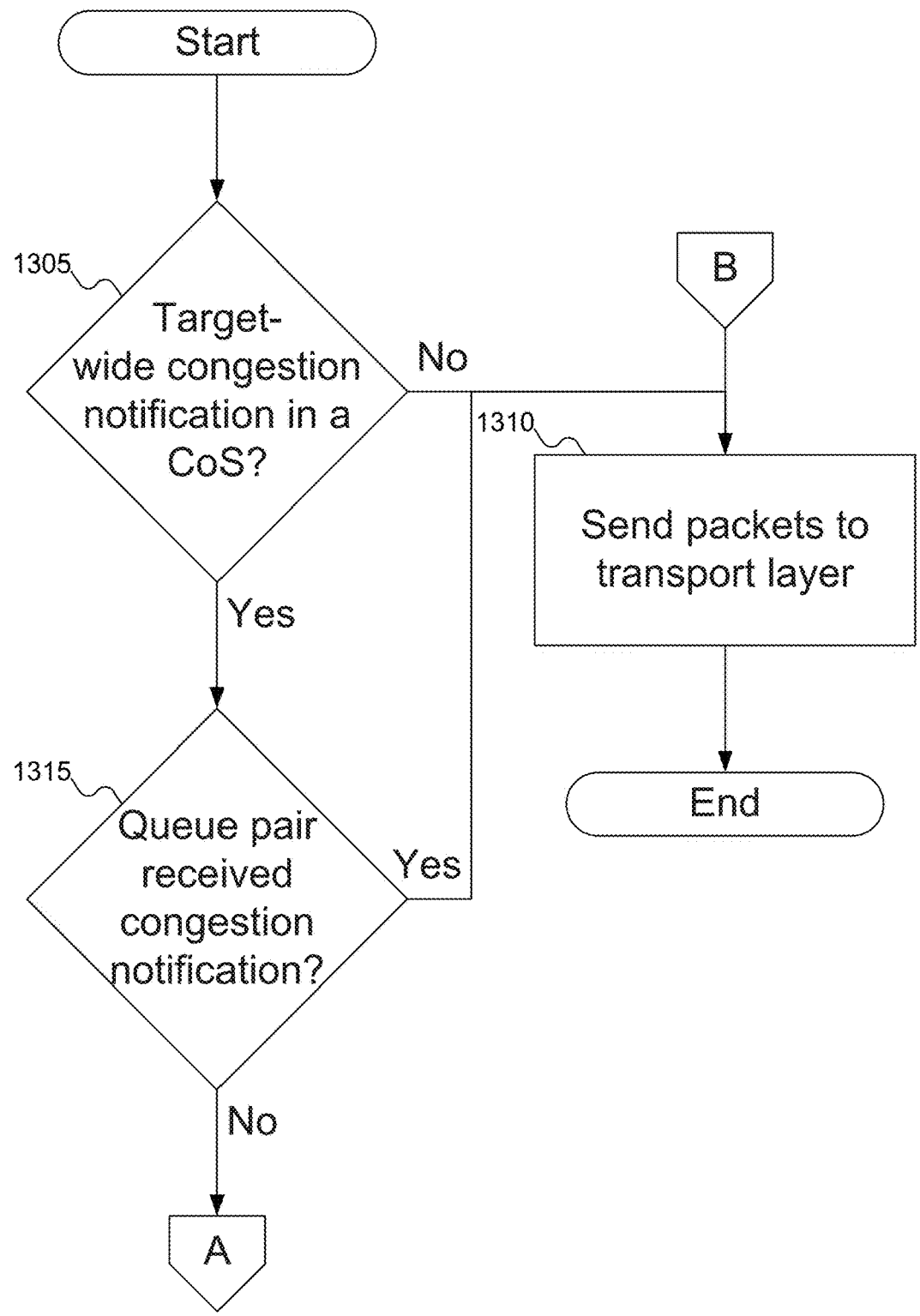
FIGS. 13A-13B show a flowchart of an example high-level overview of how the devices of FIG. 1 may apply proactive congestion control, according to embodiments of the disclosure.
Figure 13B:
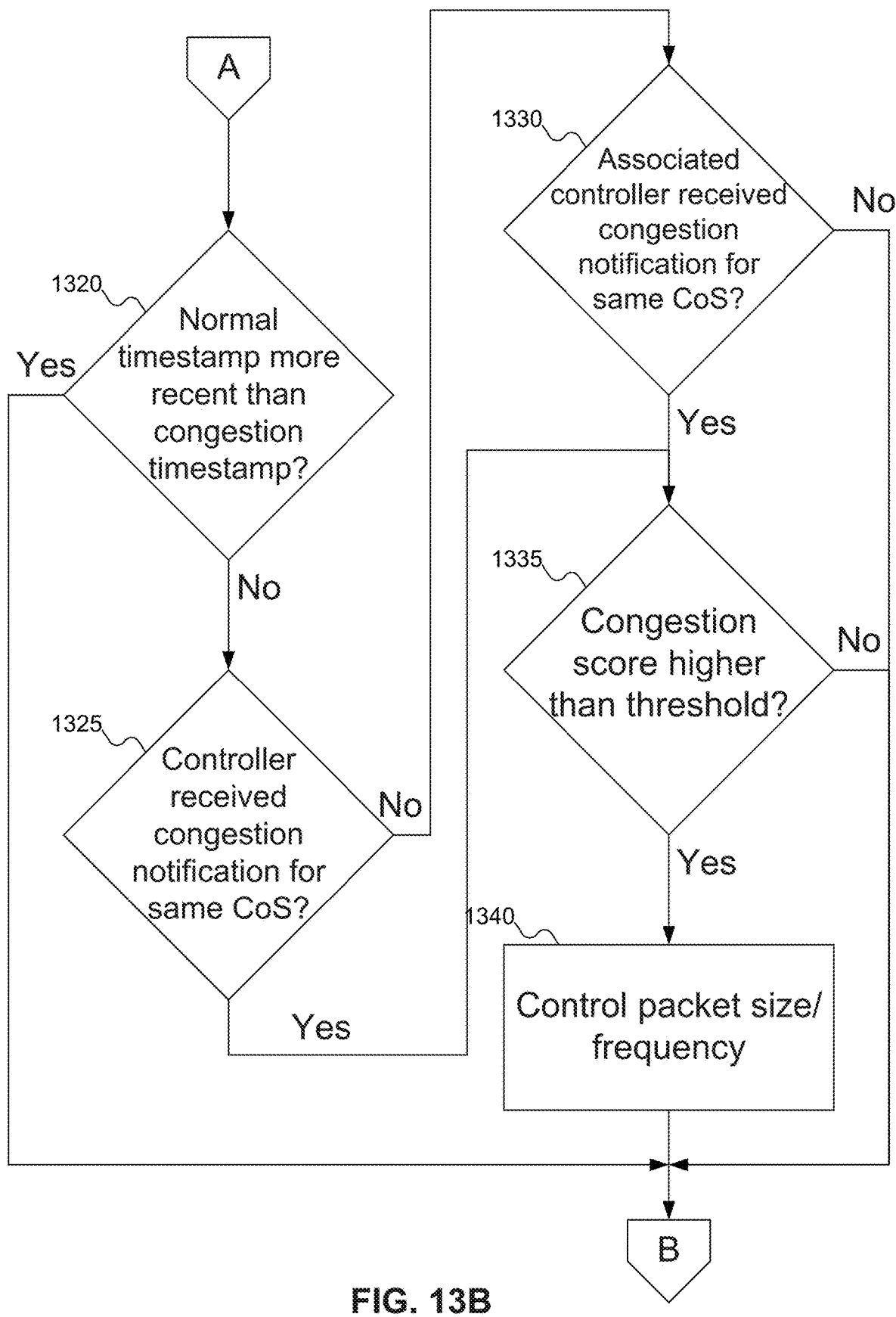

FIGS. 13A-13B show a flowchart of an example high-level overview of how devices 105 of FIG. 1 may apply proactive congestion control, according to embodiments of the disclosure. In FIG. 13A, at block 1305, device 105 of FIG. 1 may determine if it has received a packet marked with a congestion notification, for a CoS. If not, then at block 1310 packets for a particular queue pair may be sent to the transport layer without proactive congestion control. Otherwise, at block 1315, device 105 of FIG. 1 may determine if the packet marked with the congestion notification was received for the queue pair. If so, then the queue pair is already being subject to congestion control (at the transport layer at the target), and processing may continue at block 1310.

Otherwise, at block 1320 (FIG. 13B), device 105 of FIG. 1 may determine whether the queue pair has received a packet without a congestion notification more recently than the timestamp of the packet with the congestion notification. If so, then data for the queue pair may be delivered without congestion control, and processing may continue at block 1310 of FIG. 13A.

Otherwise, at block 1325, device 105 of FIG. 1 may determine if the packet marked with the congestion notification was for the same CoS as the queue pair, and at block 1330, device 105 of FIG. 1 may determine if an associated controller received the packet marked with the congestion notification for the same CoS. If both of these blocks are answered negatively, then processing may continue at block 1310 of FIG. 13A. But if either of these blocks are answered positively, then block 1335 is reached, to check if the congestion score for the queue pair exceeds a threshold. If the congestion score does not exceed the threshold, then processing may continue at block 1310 of FIG. 13A; otherwise, at block 1340, proactive congestion control may be applied to the queue pair before processing continues at block 1310 of FIG. 13A.

Figure 14:
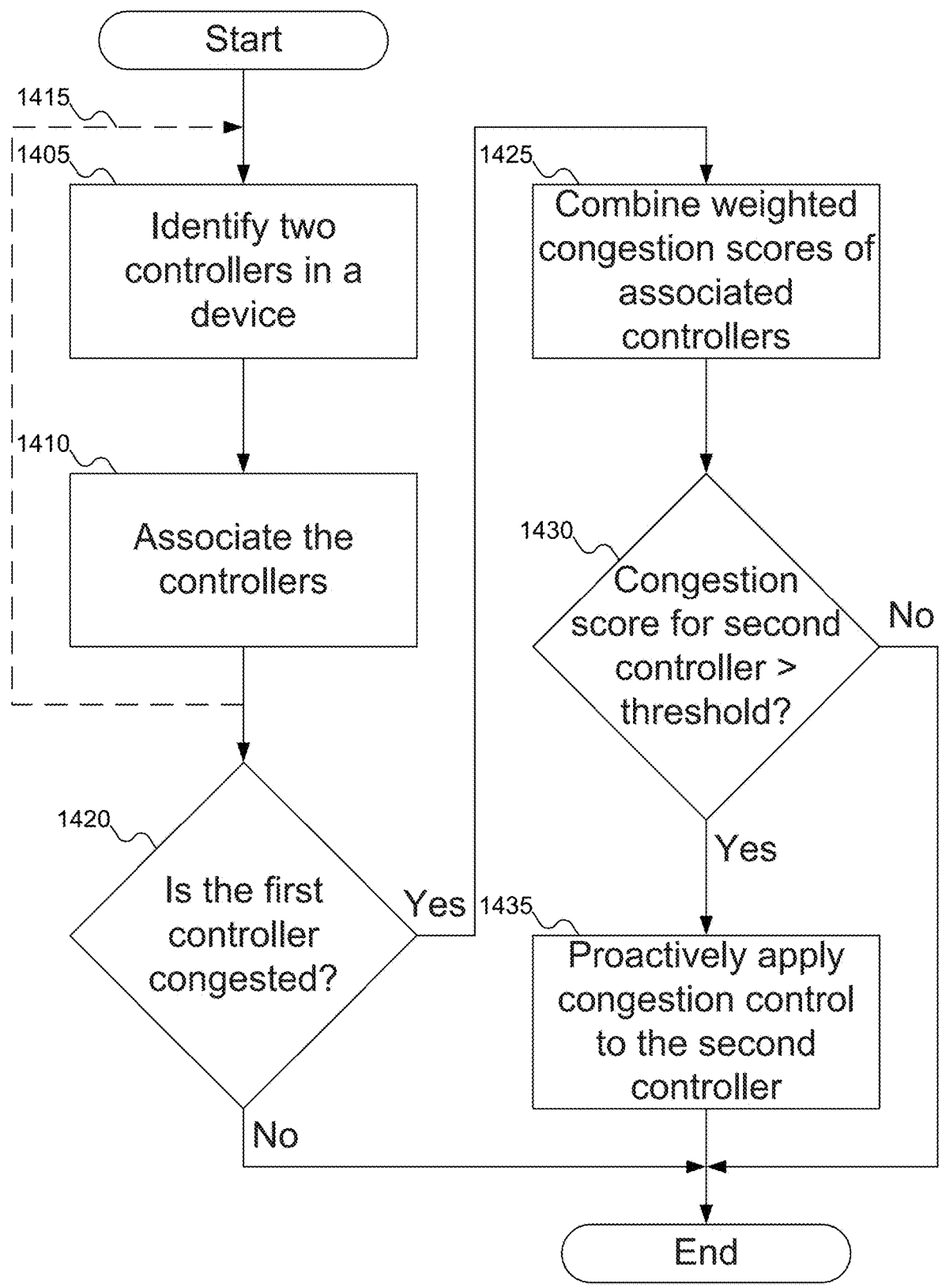
FIG. 14 shows an alternative flowchart of an example procedure for the devices of FIG. 1 to apply proactive congestion control, according to embodiments of the disclosure.

FIG. 14 shows an alternative flowchart of an example procedure for devices 105 of FIG. 1 to apply proactive congestion control, according to embodiments of the disclosure. In FIG. 14, at block 1405, device 105 of FIG. 1 may identify two controllers 210 of FIG. 2, and at block 1410, device 105 of FIG. 1 may associate the two controllers 210 of FIG. 2. Blocks 1405 and 1410 may be repeated for as many pairs of controllers 210 of FIG. 2 that are to be associated, as shown by dashed line 1415. To that end, blocks 1405 and 1410 may represent the connect phase of FIG. 8.

Once the connect phase is complete (at least, until new connections are established), the transmission phase may start at block 1420, where device 105 of FIG. 1 may receive a packet with a congestion notification. If device 105 of FIG. 1 receives a packet with a congestion notification, then at block 1425, for other controllers, device 105 of FIG. 2 may combine (for example, add) the weighted congestion scores of associated controllers. As discussed above, block 1425 may include the results of calculating then $M_C[C_i] \times V_p$ and $M_{Sys}[C_i] \times V_p$. At block 1430, these calculated congestion scores may then be compared with one or more thresholds. If any congestion scores exceed the threshold(s), then at block 1435 throttle 245 of FIG. 2 may proactively apply congestion control.

Note that the above discussion does not address what happens when connections are closed: for example, if NVMe-oF initiator 105-1 of FIG. 5 closes the connection with NVMe-oF target 105-2 of FIG. 5. In some embodiments of the disclosure, the closure of the connection does not matter: even if a queue pair might be considered subject to proactive congestion control, since the connection is closed no data would be sent there would be no impact on congestion whether or not proactive congestion control is applied. In other embodiments of the disclosure, when a connection is closed, information regarding that controller may be updated in controller associativity matrix 220 of FIG. 2, system level associativity matrix 225 of FIG. 2, controller record 230 of FIG. 2, and device-wide record 235 of FIG. 2. Specifically, for that controller 210 of FIG. 2, the associations in controller associativity matrix 220 of FIG. 2 and system level associativity matrix 225 of FIG. 2 may be updated to potentially remove some associations. Similarly, data in controller record 230 of FIG. 2 for that queue pair may be erased, which may also trigger the update of data in device-wide record 235 of FIG. 2.

Figure 15A:
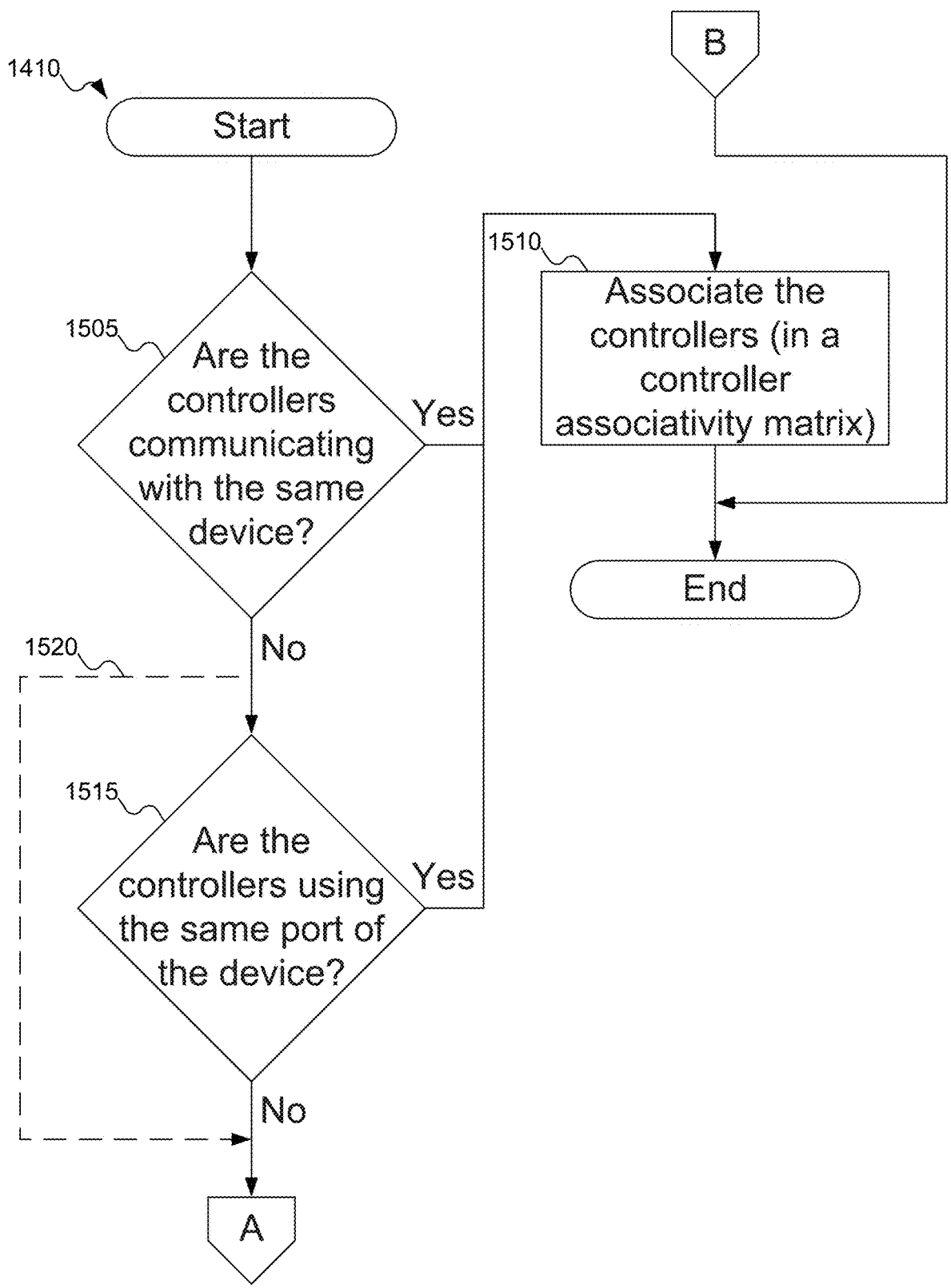
FIGS. 15A-15B show a flowchart of an example procedure for the devices of FIG. 1 to determine that two controllers of a device of FIG. 1 are associated, according to embodiments of the disclosure.
Figure 15B:
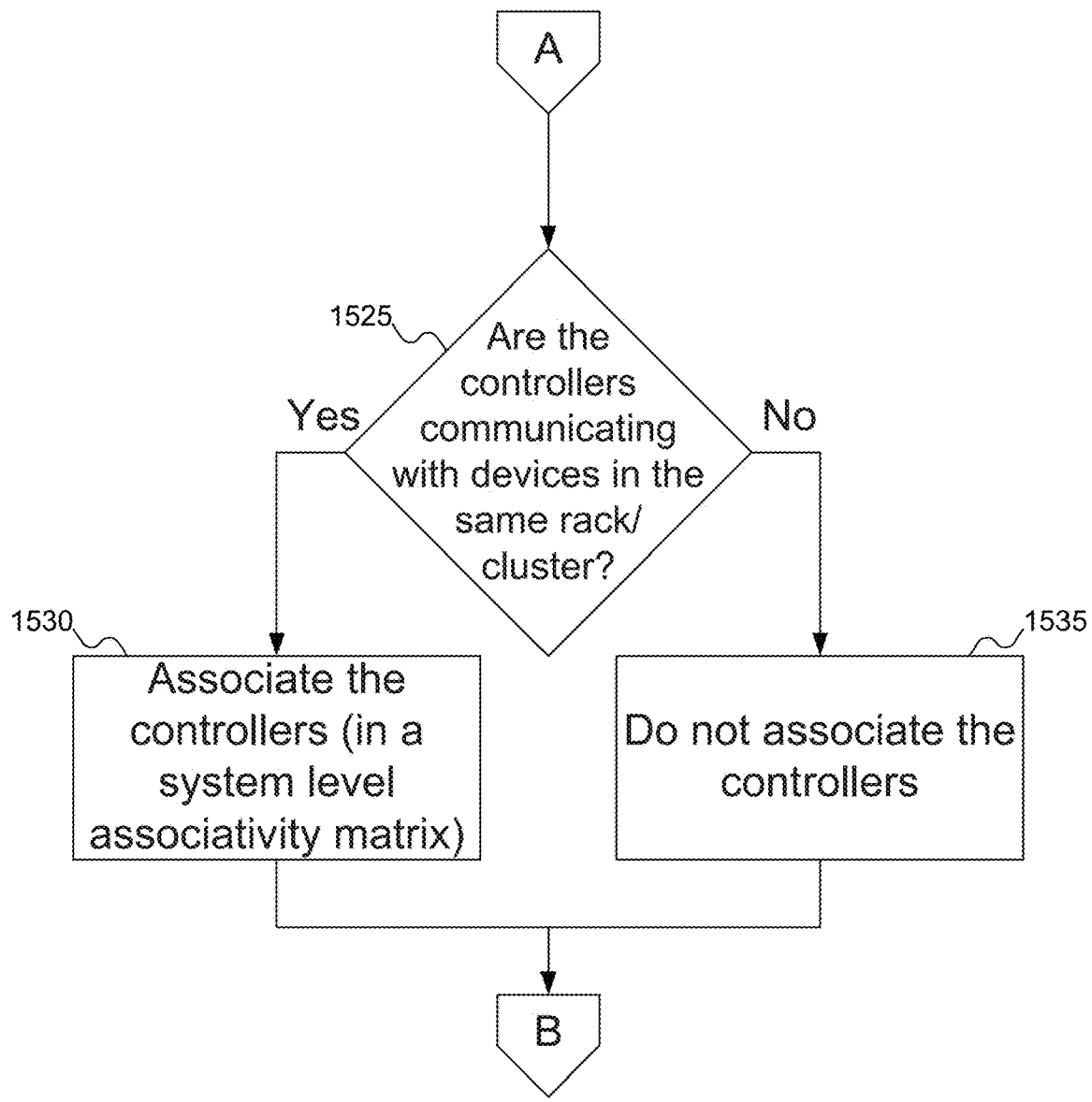

FIGS. 15A-15B show a flowchart of an example procedure for devices 105 of FIG. 1 to determine that two controllers 210 of FIG. 2 of device 105 of FIG. 1 are associated, according to embodiments of the disclosure. In FIG. 15A, at block 1505, device 105 of FIG. 1 may determine whether the two controllers 210 of FIG. 2 are communicating with the same device 105 of FIG. 1 in network 115 of FIG. 1. If so, then at block 1510 controller associativity matrix 220 of FIG. 2 may be updated to reflect that the two controllers 210 of FIG. 2 are associated. Otherwise, at block 1515, device 105 of FIG. 1 may determine whether the two controllers 210 of FIG. 2 are communicating across the same port 205 of FIG. 2 of device 105 of FIG. 1. If so, then at block 1510 controller associativity matrix 220 of FIG. 2 may be updated to reflect that the two controllers 210 of FIG. 2 are associated. Note that block 1515 may be omitted as shown by dashed line 1520.

Otherwise, at block 1525 (FIG. 15B), device 105 of FIG. 1 may determine whether the two controllers 210 of FIG. 2 are communicating with devices in the same rack or cluster (that is, whether the two controllers 210 of FIG. 2 may share any switches in their communication paths). If so, then at block 1530 system level associativity matrix 225 of FIG. 2 may be updated to reflect that the two controllers 210 of FIG. 2 are associated. Note that this associativity may be a fixed value (such as 1 to reflect the controllers are associated or 0 to reflect that the controllers are not associated), or may be within a range of values (such as between 0 and 1) to reflect varying degrees of associativity. Otherwise, at block 1535, the two controllers 210 of FIG. 2 are not associated.

Note that in FIGS. 15A-15B, if two controllers are associated in controller associativity matrix 220 of FIG. 2, the possibility of those two controllers being associated in system level associativity matrix 225 of FIG. 2 may be bypassed. In some embodiments of the disclosure, two controllers might be considered associated in both controller associativity matrix 220 of FIG. 2 and system level associativity matrix 225 of FIG. 2: that is, after block 1510 of FIG. 15A is completed, block 1525 of FIG. 15B (as well as blocks 1530 and 1535) may be performed as well.

Figure 16:
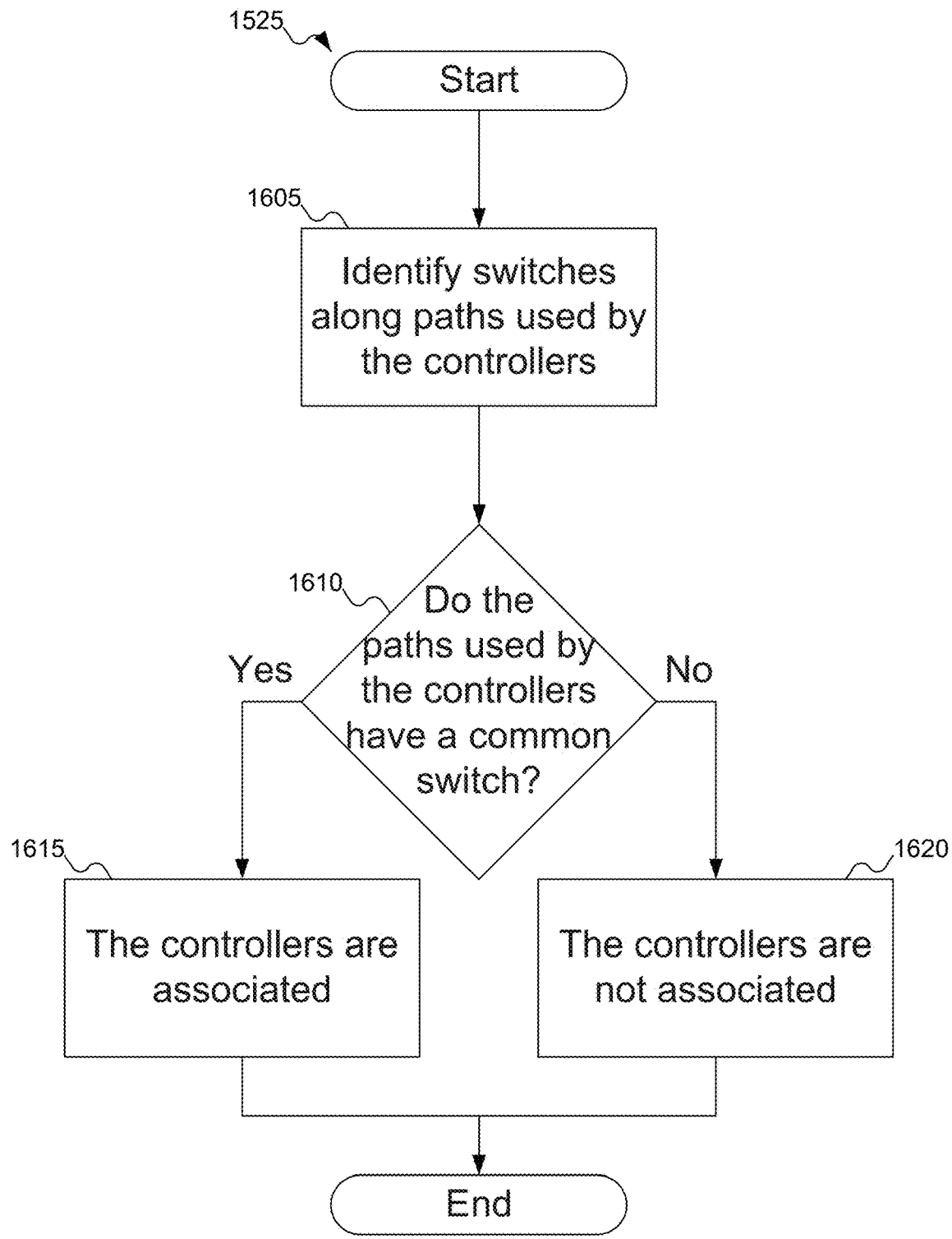
FIG. 16 shows a flowchart of an example procedure for the devices of FIG. 1 to determine that two controllers of a device of FIG. 1 are associated by having a shared switch, according to embodiments of the disclosure.

FIG. 16 shows a flowchart of an example procedure for devices 105 of FIG. 1 to determine that two controllers of device 105 of FIG. 1 are associated by having a shared switch 120 of FIG. 1, according to embodiments of the disclosure. In FIG. 16, at block 1605, path tracer 240 of FIG. 2 may identify switches along the paths from the controllers 210 of FIG. 2 to the respective devices with which the controllers 210 of FIG. 2 are communicating. At block 1610, device 105 of FIG. 1 may determine the controllers 210 of FIG. 2 have any switches in common. If so, then at block 1615, the controllers 210 of FIG. 2 are considered to be associated; otherwise, at block 1620 the controllers 210 of FIG. 2 are not considered to be associated.

Figure 17:
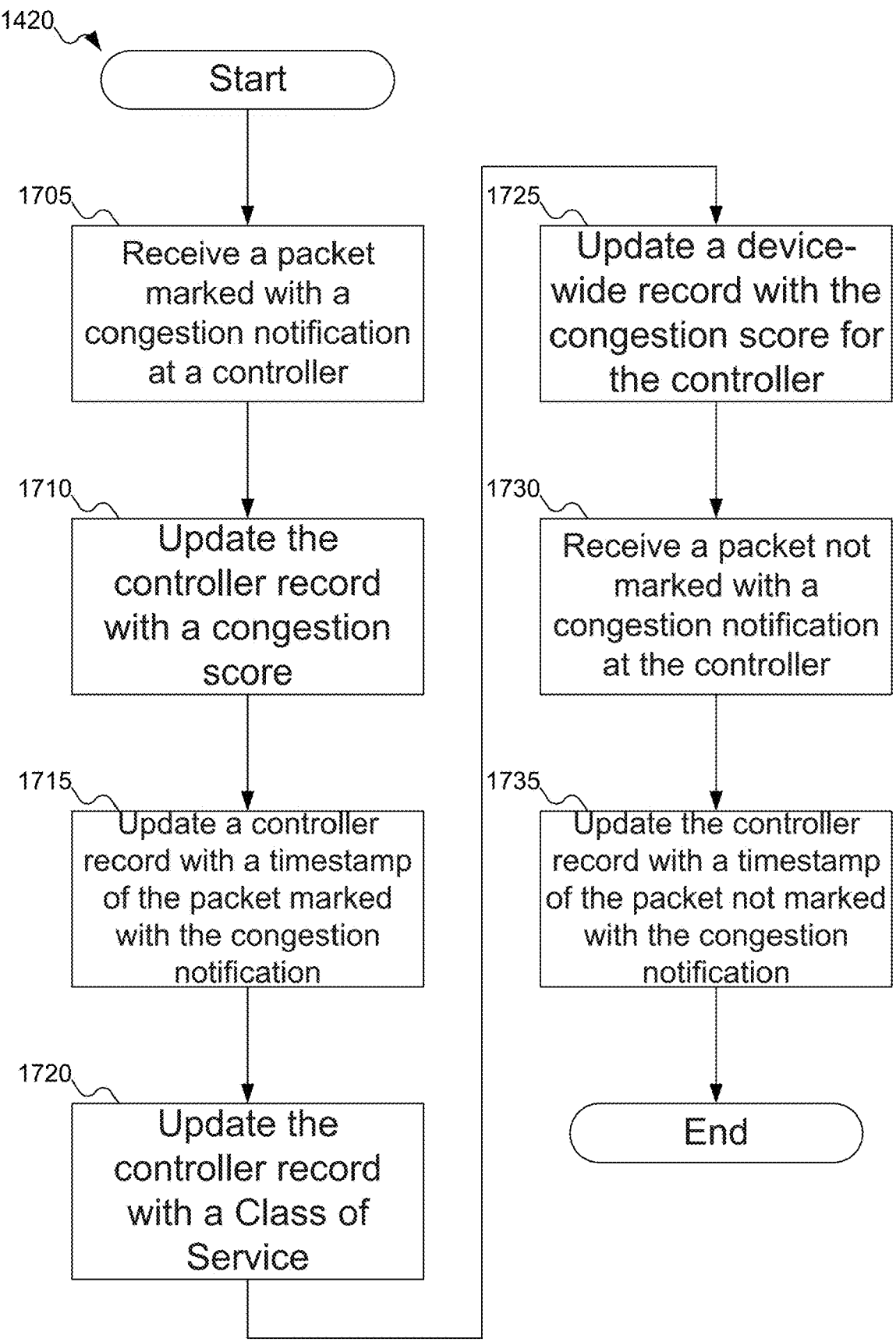
FIG. 17 shows a flowchart of an example procedure for the devices of FIG. 1 to process a congestion notification, according to embodiments of the disclosure.

FIG. 17 shows a flowchart of an example procedure for devices 105 of FIG. 1 to process a congestion notification, according to embodiments of the disclosure. In FIG. 17, at block 1705, controller 210 of FIG. 2 may receive packet 715 of FIG. 7 with congestion notification echo 720 of FIG. 7. At block 1710, device 105 of FIG. 1 may update the controller score for the controller 210 of FIG. 2 in controller record 230 of FIG. 2. At block 1715, device 105 of FIG. 1 may update the congestion timestamp for the controller 210 of FIG. 2 in controller record 230 of FIG. 2. At block 1720, device 105 of FIG. 1 may update the CoS for the queue pair for the controller 210 of FIG. 2 in controller record 230 of FIG. 2.

At block 1725, device 105 of FIG. 1 may update device-wide record 235 of FIG. 2 based on updates to controller record 230 of FIG. 2. For example, device 105 of FIG. 1 may update the controller score and/or the congestion timestamp in device-wide record 235 of FIG. 2 based on the updates to the controller score and/or the congestion timestamp in controller record 230 of FIG. 2.

At block 1730, device 105 of FIG. 1 receive a packet that is not marked with congestion notification echo 720 of FIG. 7. At block 1735, device 105 of FIG. 1 may update the uncongested timestamp for the controller 210 of FIG. 2 in controller record 230 of FIG. 2.

Figure 18:
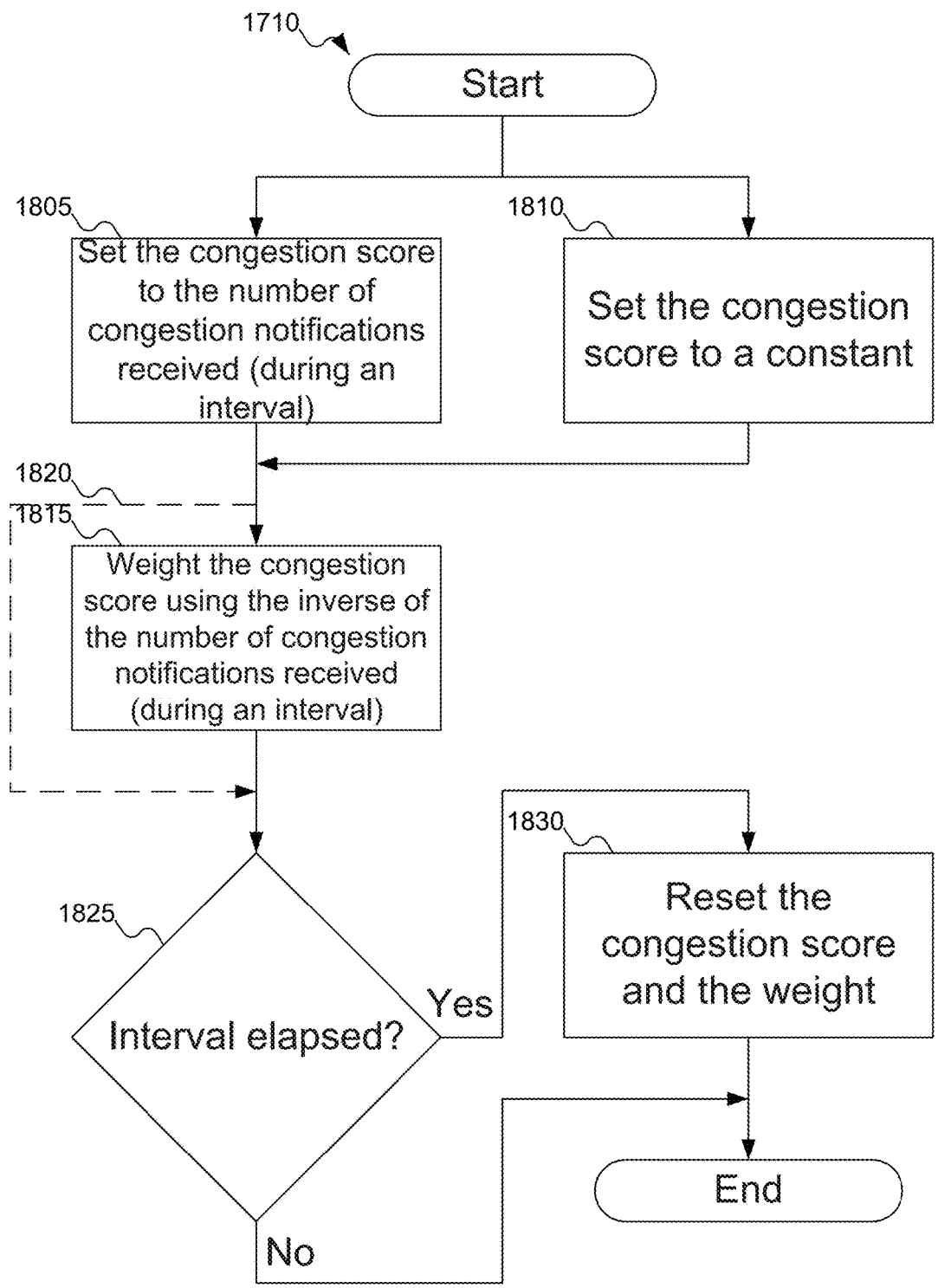
FIG. 18 shows a flowchart of an example procedure for the devices of FIG. 1 to determine a congestion score for the controllers of FIG. 2 after receiving a congestion notification, according to embodiments of the disclosure.

FIG. 18 shows a flowchart of an example procedure for devices 105 of FIG. 1 to determine a congestion score for controllers 210 of FIG. 2 after receiving a congestion notification, according to embodiments of the disclosure. In FIG. 18, at block 1805, the congestion score may be set to the number of congestion notifications received. The number of congestion notifications may be during an interval, or over the period of operation of device 105 of FIG. 1. Alternatively, at block 1810, the congestion score may be set to a constant. Either way, at block 1815, the congestion score may be weighted: for example, by a function of the number of congestion notifications received (again, over the period of operation of device 105 of FIG. 1 or during an interval). Block 1815 may be omitted, as shown by dashed line 1820.

At block 1825, device 105 of FIG. 1 may determine if an interval has passed, justifying reset of controller record 230 of FIG. 2. If so, then at block 1830 controller record 230 may be reset. As discussed above, upon an interval completing, the reset may be just of a particular queue pair in controller record 230 of FIG. 2, the entirety of controller record 230 of FIG. 2 (but for just one controller), or controller record 230 for all controllers 210 of FIG. 2. Also, as discussed above, controller record 230 of FIG. 2 may be reset by setting all information in controller record 230 to 0, or, if a congestion notification was received in a delta before the interval ended, the congestion score for that controller may be reset to a non-zero value to reflect that recent congestion notification.

Figure 19:
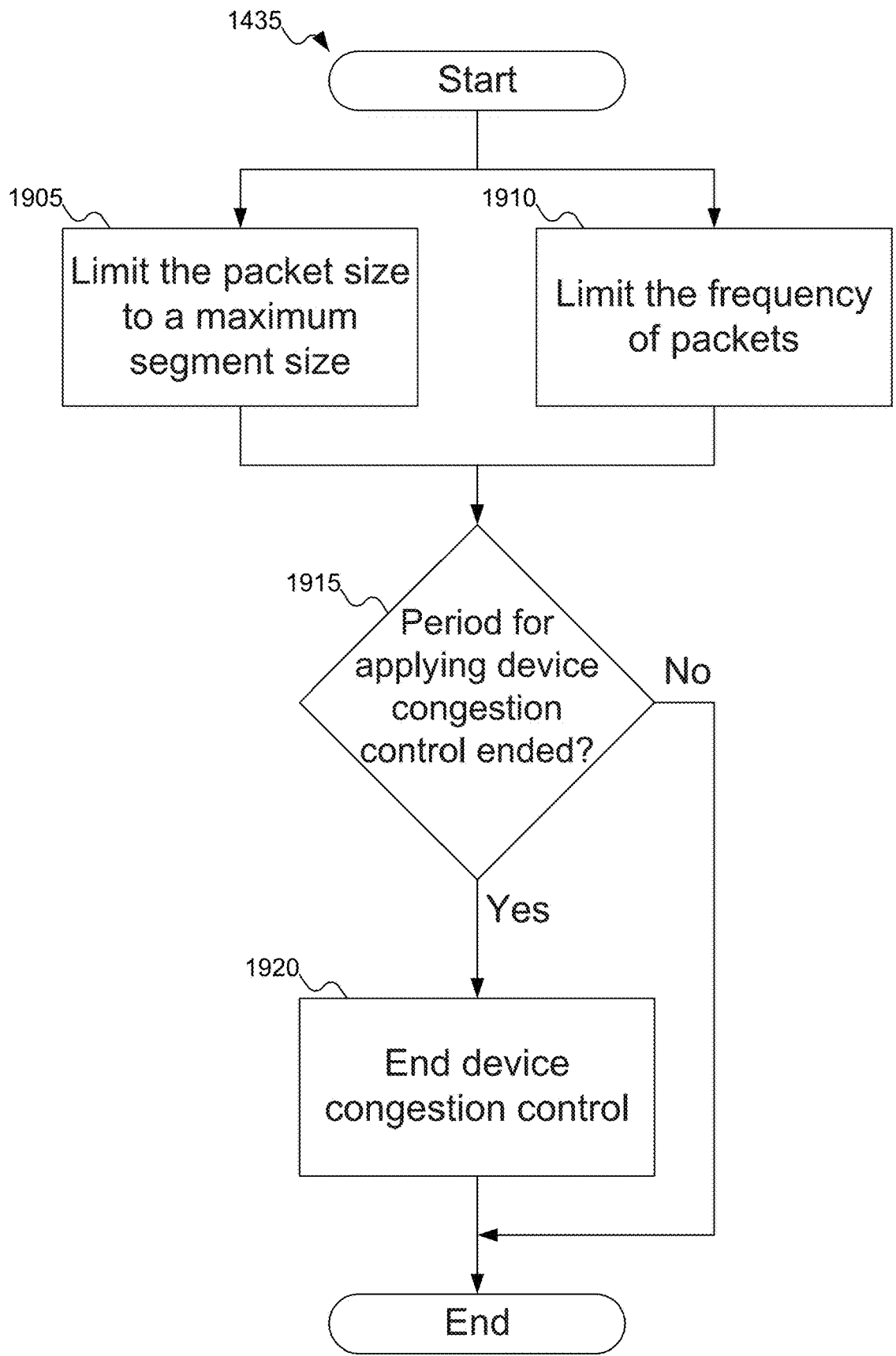
FIG. 19 shows a flowchart of an example procedure for the devices of FIG. 1 to proactively apply congestion control, according to embodiments of the disclosure.

FIG. 19 shows a flowchart of an example procedure for devices 105 of FIG. 1 to proactively apply congestion control, according to embodiments of the disclosure. In FIG. 19, at block 1905, throttle 245 of FIG. 2 may limit the size of packets to a maximum segment size (for TCP packets: other limits may be used for other protocols, and in general the packets may not exceed the MTU size for the network interface card). Alternatively, at block 1910, throttle 245 of FIG. 2 may limit the frequency with which packets are sent (adding an interpacket delay as appropriate if two or more packets are ready to be sent). By adding packets at a lower frequency, the number of packets transmitted across the network may be reduced for a period of time, during which time congestion may be attenuated or eliminated. Note that blocks 1905 and 1910 may both be applied.

At block 1915, device 105 of FIG. 1 may determine whether the period during which proactive congestion control should be applied has ended. If so, then at block 1920 throttle 245 may stop proactive congestion control.

In FIGS. 13A-19, some embodiments of the disclosure are shown. But a person skilled in the art will recognize that other embodiments of the disclosure are also possible, by changing the order of the blocks, by omitting blocks, or by including links not shown in the drawings. All such variations of the flowcharts are considered to be embodiments of the disclosure, whether expressly described or not.

Embodiments of the disclosure offer technical advantages over the prior art. By identifying congestion on associated controllers, a device may apply congestion control to a controller proactively. This proactive congestion control may prevent congestion affecting one controller from affecting other controllers as well.

The following discussion is intended to provide a brief, general description of a suitable machine or machines in which certain aspects of the disclosure may be implemented. The machine or machines may be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines may include embedded controllers, such as programmable or non-programmable logic devices or arrays, Application Specific Integrated Circuits (ASICs), embedded computers, smart cards, and the like. The machine or machines may utilize one or more connections to one or more remote machines, such as through a network interface, modem, or other communicative coupling. Machines may be interconnected by way of a physical and/or logical network, such as an intranet, the Internet, local area networks, wide area networks, etc. One skilled in the art will appreciate that network communication may utilize various wired and/or wireless short range or long range carriers and protocols, including radio frequency (RF), satellite, microwave, Institute of Electrical and Electronics Engineers (IEEE) 802.11, Bluetooth®, optical, infrared, cable, laser, etc.

Embodiments of the present disclosure may be described by reference to or in conjunction with associated data including functions, procedures, data structures, application programs, etc. which when accessed by a machine results in the machine performing tasks or defining abstract data types or low-level hardware contexts. Associated data may be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data may be delivered over transmission environments, including the physical and/or logical network, in the form of packets, serial data, parallel data, propagated signals, etc., and may be used in a compressed or encrypted format. Associated data may be used in a distributed environment, and stored locally and/or remotely for machine access.

Embodiments of the disclosure may include a tangible, non-transitory machine-readable medium comprising instructions executable by one or more processors, the instructions comprising instructions to perform the elements of the disclosures as described herein.

The various operations of methods described above may be performed by any suitable means capable of performing the operations, such as various hardware and/or software component(s), circuits, and/or module(s). The software may comprise an ordered listing of executable instructions for implementing logical functions, and may be embodied in any "processor-readable medium" for use by or in connection with an instruction execution system, apparatus, or device, such as a single or multiple-core processor or processor-containing system.

The blocks or steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

Having described and illustrated the principles of the disclosure with reference to illustrated embodiments, it will be recognized that the illustrated embodiments may be modified in arrangement and detail without departing from such principles, and may be combined in any desired manner. And, although the foregoing discussion has focused on particular embodiments, other configurations are contemplated. In particular, even though expressions such as "according to an embodiment of the disclosure" or the like are used herein, these phrases are meant to generally reference embodiment possibilities, and are not intended to limit the disclosure to particular embodiment configurations. As used herein, these terms may reference the same or different embodiments that are combinable into other embodiments.

The foregoing illustrative embodiments are not to be construed as limiting the disclosure thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of this disclosure as defined in the claims.

Embodiments of the disclosure may extend to the following statements, without limitation:

Statement 1. An embodiment of the disclosure includes a device, comprising:
  a network port to connect to a network;
  a first controller configured to send and receive a first communication across the network using the network port;
  a first storage for a controller record for the first controller, the controller record including at least a first congestion score, a first congestion timestamp, and an uncongested timestamp;
  a second storage for a device-wide record, the device-wide record including at least a second congestion score and a second congestion timestamp for the first controller and a third congestion score and a third congestion timestamp for a second controller, the device-wide record based at least in part on the controller record; and
  a throttle to limit a second communication of a second controller based at least in part on the device-wide record.

Statement 2. An embodiment of the disclosure includes the device according to statement 1, wherein the device-wide record further includes a first Class of Service (CoS) for the first controller and a second CoS for the second controller.

Statement 3. An embodiment of the disclosure includes the device according to statement 1, wherein the network port includes an Ethernet port.

Statement 4. An embodiment of the disclosure includes the device according to statement 1, wherein:
  the first controller includes a first Non-Volatile Memory Express (NVMe) over Fabrics (NVMe-oF) controller; and
  the second controller includes a second NVMe-oF controller.

Statement 5. An embodiment of the disclosure includes the device according to statement 4, wherein:
  the device further comprises a third storage for a controller associativity matrix; and
  the throttle is configured to limit the second communication of the second NVMe-oF controller based at least in part on the controller associativity matrix and the device-wide record.

Statement 6. An embodiment of the disclosure includes the device according to statement 5, wherein:
  the first NVMe-oF controller is configured to send and receive the first communication across the network to a second device using the network port;
  the second NVMe-oF controller is configured to send and receive the second communication across the network to the second device; and
  the controller associativity matrix indicates that the first NVMe-oF controller and the second NVMe-oF controller are associated.

Statement 7. An embodiment of the disclosure includes the device according to statement 6, wherein the second NVMe-oF controller is configured to send and receive the second communication across the network to the second device using one of the network port and a second network port.

Statement 8. An embodiment of the disclosure includes the device according to statement 5, wherein:
  the first NVMe-oF controller is configured to send and receive the first communication across the network to a second device using the network port;
  the second NVMe-oF controller is configured to send and receive the second communication across the network to a third device using the network port; and
  the controller associativity matrix indicates that the first NVMe-oF controller and the second NVMe-oF controller are associated.

Statement 9. An embodiment of the disclosure includes the device according to statement 4, wherein:
  the device further comprises:
    a second network port to connect to the network;
    a fourth storage for a system level associativity matrix; and
    a path tracer;
  the first NVMe-oF controller is configured to send and receive the first communication across the network to a second device using the network port;
  the second NVMe-oF controller is configured to send and receive the second communication across the network to a third device using the second network port;
  the path tracer is configured to identify a switch along a first path from the first NVMe-oF controller to the second device and to identify the switch along a second path from the second NVMe-oF controller to the third device;
  the throttle is configured to limit the second communication of the second NVMe-oF controller based at least in part on the system level associativity matrix and the device-wide record; and
  the system level associativity matrix indicates that the first NVMe-oF controller and the second NVMe-oF controller are associated.

Statement 10. An embodiment of the disclosure includes the device according to statement 4, wherein the throttle is configured to determine that the first communication is congested based at least in part on a packet of the first communication marked with a congestion notification.

Statement 11. An embodiment of the disclosure includes the device according to statement 4, wherein the throttle is configured to limit the second communication of the second controller based at least in part on a weighted congestion score and a threshold.

Statement 12. An embodiment of the disclosure includes the device according to statement 11, wherein the throttle includes a calculator to calculate the weighted congestion score based at least in part on at least one of the device-wide record, a controller associativity matrix, or a system level associativity matrix.

Statement 13. An embodiment of the disclosure includes the device according to statement 4, wherein the throttle is configured to limit at least one of a packet size of the second communication or a frequency of packets sent for the second communication.

Statement 14. An embodiment of the disclosure includes the device according to statement 4, wherein the throttle is configured to limit the second communication of the second controller for a period.

Statement 15. An embodiment of the disclosure includes the device according to statement 14, wherein the period includes an estimated transmission time.

Statement 16. An embodiment of the disclosure includes the device according to statement 4, wherein the device is one of at least an NVMe-oF initiator and an NVMe-oF target.

Statement 17. An embodiment of the disclosure includes a method, comprising:
identifying a first controller in a device and a second controller in the device;
associating the first controller and the second controller;
determining that a first communication using the first controller is subject to network congestion at a switch; and
applying device congestion control to a second communication using the second controller.

Statement 18. An embodiment of the disclosure includes the method according to statement 17, wherein:
the first controller includes a first Non-Volatile Memory Express (NVMe) over Fabrics (NVMe-oF) controller; and
the second controller includes a second NVMe-oF controller.

Statement 19. An embodiment of the disclosure includes the method according to statement 18, wherein associating the first controller and the second controller includes associating the first NVMe-oF controller and the second NVMe-oF controller based at least in part on the first NVMe-oF controller in the device communicating with a second device and the second NVMe-oF controller in the device communicating with the second device.

Statement 20. An embodiment of the disclosure includes the method according to statement 18, wherein associating the first controller and the second controller includes associating the first NVMe-oF controller and the second NVMe-oF controller based at least in part on the first NVMe-oF controller communicating using a port of the device and the second NVMe-oF controller communicating using the port of the device.

Statement 21. An embodiment of the disclosure includes the method according to statement 20, wherein associating the first controller and the second controller includes marking that the first NVMe-oF controller and the second NVMe-oF controller are associated in a controller associativity matrix.

Statement 22. An embodiment of the disclosure includes the method according to statement 18, wherein associating the first controller and the second controller includes associating the first NVMe-oF controller and the second NVMe-oF controller based at least in part on the first NVMe-oF controller in the device communicating with a second device and the second NVMe-oF controller in the device communicating with a third device, the second device and the third device in a rack.

Statement 23. An embodiment of the disclosure includes the method according to statement 22, wherein associating the first controller and the second controller further includes:
identifying the switch along a first path from the first NVMe-oF controller to the second device; and
identifying the switch along a second path from the second NVMe-oF controller to the third device.

Statement 24. An embodiment of the disclosure includes the method according to statement 22, wherein associating the first controller and the second controller includes marking that the first NVMe-oF controller and the second NVMe-oF controller are associated in a system level associativity matrix.

Statement 25. An embodiment of the disclosure includes the method according to statement 18, wherein associating the first controller and the second controller includes associating the first NVMe-oF controller and the second NVMe-oF controller based at least in part on the first NVMe-oF controller in the device communicating with a second device and the second NVMe-oF controller in the device communicating with a third device, the second device and the third device in a cluster.

Statement 26. An embodiment of the disclosure includes the method according to statement 25, wherein associating the first controller and the second controller further includes:
identifying the switch along a first path from the first NVMe-oF controller to the second device; and
identifying the switch along a second path from the second NVMe-oF controller to the third device.

Statement 27. An embodiment of the disclosure includes the method according to statement 25, wherein associating the first controller and the second controller includes marking that the first NVMe-oF controller and the second NVMe-oF controller are associated in a system level associativity matrix.

Statement 28. An embodiment of the disclosure includes the method according to statement 18, wherein determining that the first communication using the first controller is subject to network congestion at the switch includes receiving at the first NVMe-oF controller a packet for the first communication marked with a congestion notification.

Statement 29. An embodiment of the disclosure includes the method according to statement 28, wherein receiving at the first NVMe-oF controller the packet for the first communication marked with the congestion notification includes updating a controller record for the first NVMe-oF controller with a congestion timestamp of the packet.

Statement 30. An embodiment of the disclosure includes the method according to statement 28, wherein receiving at the first NVMe-oF controller the packet for the first communication marked with the congestion notification includes updating the controller record for the first NVMe-oF controller with a congestion score.

Statement 31. An embodiment of the disclosure includes the method according to statement 30, wherein the congestion score includes a count of a number of congestion notifications received at the first NVMe-oF controller.

Statement 32. An embodiment of the disclosure includes the method according to statement 31, wherein the congestion score includes the count of the number of congestion notifications received at the first NVMe-oF controller during an interval.

Statement 33. An embodiment of the disclosure includes the method according to statement 30, wherein the congestion score includes a constant value.

Statement 34. An embodiment of the disclosure includes the method according to statement 30, wherein updating the controller record for the first NVMe-oF controller with the congestion score includes weighing the congestion score for the first NVMe-oF controller using a weight to produce a weighted congestion score.

Statement 35. An embodiment of the disclosure includes the method according to statement 34, wherein the weight includes a number of congestion notifications received at the first NVMe-oF controller.

Statement 36. An embodiment of the disclosure includes the method according to statement 35, wherein the weight includes the number of congestion notifications received a the first NVMe-oF controller during an interval.

Statement 37. An embodiment of the disclosure includes the method according to statement 35, wherein the weight includes an inverse of the number of congestion notifications received at the first NVMe-oF controller.

Statement 38. An embodiment of the disclosure includes the method according to statement 30, wherein receiving at the first NVMe-oF controller the packet for the first communication marked with the congestion notification further includes updating a device-wide record with the congestion score for the first NVMe-oF controller.

Statement 39. An embodiment of the disclosure includes the method according to statement 28, wherein receiving at the first NVMe-oF controller the packet for the first communication marked with the congestion notification includes updating the controller record for the first NVMe-oF controller with an uncongested timestamp of a last uncongested packet.

Statement 40. An embodiment of the disclosure includes the method according to statement 28, wherein receiving at the first NVMe-oF controller the packet for the first communication marked with the congestion notification includes updating the controller record for the first NVMe-oF controller with a Class of Service (CoS) for a queue pair associated with the packet.

Statement 41. An embodiment of the disclosure includes the method according to statement 18, wherein determining that the first communication using the first controller is subject to network congestion at the switch further includes comparing a congestion score for the second NVMe-oF controller with a threshold.

Statement 42. An embodiment of the disclosure includes the method according to statement 41, wherein comparing the congestion score for the second NVMe-oF controller with a threshold includes using a weighted congestion score for the first NVMe-oF controller as the congestion score for the second NVMe-oF controller.

Statement 43. An embodiment of the disclosure includes the method according to statement 41, wherein comparing the congestion score for the second NVMe-oF controller with a threshold includes:
identifying a first weighted congestion score for the first NVMe-oF controller;
identifying a second weighted congestion score for a third NVMe-oF controller, the third NVMe-oF controller associated with the second NVMe-oF controller; and
combining the first weighted congestion score for the first NVMe-oF controller and the second weighted congestion score for the third NVMe-oF controller to produce the congestion score for the second NVMe-oF controller.

Statement 44. An embodiment of the disclosure includes the method according to statement 41, wherein applying device congestion control to the second communication using the second controller includes applying device congestion control to the second communication using the second controller based at least in part on the congestion score for the second NVMe-oF controller exceeding the threshold.

Statement 45. An embodiment of the disclosure includes the method according to statement 18, wherein applying device congestion control to the second communication using the second controller includes at least one of limiting a packet size the second communication to a maximum segment size and limiting a frequency of packets sent for the second communication.

Statement 46. An embodiment of the disclosure includes the method according to statement 18, wherein applying device congestion control to the second communication using the second controller includes applying device congestion control to the second communication for a period.

Statement 47. An embodiment of the disclosure includes the method according to statement 46, wherein the period includes an estimated transmission time.

Statement 48. An embodiment of the disclosure includes the method according to statement 18, wherein the device is one of at least an NVMe-oF initiator and an NVMe-oF target.

Statement 49. An embodiment of the disclosure includes an article, comprising a non-transitory storage medium, the non-transitory storage medium having stored thereon instructions that, when executed by a machine, result in:
identifying a first controller in a device and a second controller in the device;
associating the first controller and the second controller;
determining that a first communication using the first controller is subject to network congestion at a switch; and
applying device congestion control to a second communication using the second controller.

Statement 50. An embodiment of the disclosure includes the article according to statement 49, wherein:
the first controller includes a first Non-Volatile Memory Express (NVMe) over Fabrics (NVMe-oF) controller; and
the second controller includes a second NVMe-oF controller.

Statement 51. An embodiment of the disclosure includes the article according to statement 50, wherein associating the first controller and the second controller includes associating the first NVMe-oF controller and the second NVMe-oF controller based at least in part on the first NVMe-oF controller in the device communicating with a second device and the second NVMe-oF controller in the device communicating with the second device.

Statement 52. An embodiment of the disclosure includes the article according to statement 50, wherein associating the first controller and the second controller includes associating the first NVMe-oF controller and the second NVMe-oF controller based at least in part on the first NVMe-oF controller communicating using a port of the device and the second NVMe-oF controller communicating using the port of the device.

Statement 53. An embodiment of the disclosure includes the article according to statement 52, wherein associating the first controller and the second controller includes marking that the first NVMe-oF controller and the second NVMe-oF controller are associated in a controller associativity matrix.

Statement 54. An embodiment of the disclosure includes the article according to statement 50, wherein associating the first controller and the second controller includes associating the first NVMe-oF controller and the second NVMe-oF controller based at least in part on the first NVMe-oF controller in the device communicating with a second device and the second NVMe-oF controller in the device communicating with a third device, the second device and the third device in a rack.

Statement 55. An embodiment of the disclosure includes the article according to statement 54, wherein associating the first controller and the second controller further includes:
identifying the switch along a first path from the first NVMe-oF controller to the second device; and
identifying the switch along a second path from the second NVMe-oF controller to the third device.

Statement 56. An embodiment of the disclosure includes the article according to statement 54, wherein associating the first controller and the second controller includes marking that the first NVMe-oF controller and the second NVMe-oF controller are associated in a system level associativity matrix.

Statement 57. An embodiment of the disclosure includes the article according to statement 50, wherein associating the first controller and the second controller includes associating the first NVMe-oF controller and the second NVMe-oF controller based at least in part on the first NVMe-oF controller in the device communicating with a second device and the second NVMe-oF controller in the device communicating with a third device, the second device and the third device in a cluster.

Statement 58. An embodiment of the disclosure includes the article according to statement 57, wherein associating the first controller and the second controller further includes:
identifying the switch along a first path from the first NVMe-oF controller to the second device; and
identifying the switch along a second path from the second NVMe-oF controller to the third device.

Statement 59. An embodiment of the disclosure includes the article according to statement 57, wherein associating the first controller and the second controller includes marking that the first NVMe-oF controller and the second NVMe-oF controller are associated in a system level associativity matrix.

Statement 60. An embodiment of the disclosure includes the article according to statement 50, wherein determining that the first communication using the first controller is subject to network congestion at the switch includes receiving at the first NVMe-oF controller a packet for the first communication marked with a congestion notification.

Statement 61. An embodiment of the disclosure includes the article according to statement 60, wherein receiving at the first NVMe-oF controller the packet for the first communication marked with the congestion notification includes updating a controller record for the first NVMe-oF controller with a congestion timestamp of the packet.

Statement 62. An embodiment of the disclosure includes the article according to statement 60, wherein receiving at the first NVMe-oF controller the packet for the first communication marked with the congestion notification includes updating the controller record for the first NVMe-oF controller with a congestion score.

Statement 63. An embodiment of the disclosure includes the article according to statement 62, wherein the congestion score includes a count of a number of congestion notifications received at the first NVMe-oF controller.

Statement 64. An embodiment of the disclosure includes the article according to statement 63, wherein the congestion score includes the count of the number of congestion notifications received at the first NVMe-oF controller during an interval.

Statement 65. An embodiment of the disclosure includes the article according to statement 62, wherein the congestion score includes a constant value.

Statement 66. An embodiment of the disclosure includes the article according to statement 62, wherein updating the controller record for the first NVMe-oF controller with the congestion score includes weighing the congestion score for the first NVMe-oF controller using a weight to produce a weighted congestion score.

Statement 67. An embodiment of the disclosure includes the article according to statement 66, wherein the weight includes a number of congestion notifications received at the first NVMe-oF controller.

Statement 68. An embodiment of the disclosure includes the article according to statement 67, wherein the weight includes the number of congestion notifications received a the first NVMe-oF controller during an interval.

Statement 69. An embodiment of the disclosure includes the article according to statement 67, wherein the weight includes an inverse of the number of congestion notifications received at the first NVMe-oF controller.

Statement 70. An embodiment of the disclosure includes the article according to statement 62, wherein receiving at the first NVMe-oF controller the packet for the first communication marked with the congestion notification further includes updating a device-wide record with the congestion score for the first NVMe-oF controller.

Statement 71. An embodiment of the disclosure includes the article according to statement 60, wherein receiving at the first NVMe-oF controller the packet for the first communication marked with the congestion notification includes updating the controller record for the first NVMe-oF controller with an uncongested timestamp of a last uncongested packet.

Statement 72. An embodiment of the disclosure includes the article according to statement 60, wherein receiving at the first NVMe-oF controller the packet for the first communication marked with the congestion notification includes updating the controller record for the first NVMe-oF controller with a Class of Service (CoS) for a queue pair associated with the packet.

Statement 73. An embodiment of the disclosure includes the article according to statement 50, wherein determining that the first communication using the first controller is subject to network congestion at the switch further includes comparing a congestion score for the second NVMe-oF controller with a threshold.

Statement 74. An embodiment of the disclosure includes the article according to statement 73, wherein comparing the congestion score for the second NVMe-oF controller with a threshold includes using a weighted congestion score for the first NVMe-oF controller as the congestion score for the second NVMe-oF controller.

Statement 75. An embodiment of the disclosure includes the article according to statement 73, wherein comparing the congestion score for the second NVMe-oF controller with a threshold includes:
identifying a first weighted congestion score for the first NVMe-oF controller;
identifying a second weighted congestion score for a third NVMe-oF controller, the third NVMe-oF controller associated with the second NVMe-oF controller; and
combining the first weighted congestion score for the first NVMe-oF controller and the second weighted congestion score for the third NVMe-oF controller to produce the congestion score for the second NVMe-oF controller.

Statement 76. An embodiment of the disclosure includes the article according to statement 73, wherein applying device congestion control to the second communication using the second controller includes applying device congestion control to the second communication using the second controller based at least in part on the congestion score for the second NVMe-oF controller exceeding the threshold.

Statement 77. An embodiment of the disclosure includes the article according to statement 50, wherein applying device congestion control to the second communication using the second controller includes at least one of limiting a packet size the second communication to a maximum segment size and limiting a frequency of packets sent for the second communication.

Statement 78. An embodiment of the disclosure includes the article according to statement 50, wherein applying device congestion control to the second communication using the second controller includes applying device congestion control to the second communication for a period.

Statement 79. An embodiment of the disclosure includes the article according to statement 78, wherein the period includes an estimated transmission time.

Statement 80. An embodiment of the disclosure includes the article according to statement 50, wherein the device is one of at least an NVMe-oF initiator and an NVMe-oF target.

Consequently, in view of the wide variety of permutations to the embodiments described herein, this detailed description and accompanying material is intended to be illustrative only, and should not be taken as limiting the scope of the disclosure. What is claimed as the disclosure, therefore, is all such modifications as may come within the scope and spirit of the following claims and equivalents thereto.

What is claimed is:

1. A device, comprising:
a network port to connect to a network;
a first controller configured to send or receive a first communication across the network using the network port;
a second controller configured to send or receive a second communication across the network using the network port;
a first storage for a controller record for the first controller, the controller record including at least a first congestion score, a first congestion timestamp, and an uncongested timestamp;
a second storage for a device-wide record, the device-wide record including at least a second congestion score and a second congestion timestamp for the first controller and a third congestion score and a third congestion timestamp for the second controller, the device-wide record based at least in part on the controller record; and
a throttle to limit the second communication of the second controller based at least in part on the device-wide record.

2. The device according to claim 1, wherein:
the first controller includes a first Non-Volatile Memory Express (NVMe) over Fabrics (NVMe-oF) controller; and
the second controller includes a second NVMe-oF controller.

3. The device according to claim 2, wherein:
the device further comprises a third storage for a controller associativity matrix; and
the throttle is configured to limit the second communication of the second NVMe-oF controller based at least in part on the controller associativity matrix and the device-wide record.

4. The device according to claim 3, wherein:
the first NVMe-oF controller is configured to send and receive the first communication across the network to a second device using the network port;
the second NVMe-oF controller is configured to send and receive the second communication across the network to the second device; and
the controller associativity matrix indicates that the first NVMe-oF controller and the second NVMe-oF controller are associated.

5. The device according to claim 2, wherein:
the device further comprises:
a second network port to connect to the network;
a fourth storage for a system level associativity matrix; and
a path tracer;
the first NVMe-oF controller is configured to send and receive the first communication across the network to a second device using the network port;
the second NVMe-oF controller is configured to send and receive the second communication across the network to a third device using the second network port;
the path tracer is configured to identify a switch along a first path from the first NVMe-oF controller to the second device and to identify the switch along a second path from the second NVMe-oF controller to the third device;
the throttle is configured to limit the second communication of the second NVMe-oF controller based at least in part on the system level associativity matrix and the device-wide record; and
the system level associativity matrix indicates that the first NVMe-oF controller and the second NVMe-oF controller are associated.

6. The device according to claim 2, wherein the throttle is configured to determine that the first communication is congested based at least in part on a packet of the first communication marked with a congestion notification.

7. The device according to claim 2, wherein the throttle is configured to limit the second communication of the second controller based at least in part on a weighted congestion score and a threshold.

8. The device according to claim 7, wherein the throttle includes a calculator to calculate the weighted congestion score based at least in part on at least one of the device-wide record, a controller associativity matrix, or a system level associativity matrix.

9. The device according to claim 2, wherein the throttle is configured to limit at least one of a packet size of the second communication or a frequency of packets sent for the second communication.

10. A method, comprising:
identifying a first controller in a device and a second controller in the device;
storing a first congestion score and a first congestion time indicator for the first controller and a second congestion score and a second congestion time indicator for the second controller in the device;
determining that a first communication using the first controller is subject to network congestion at a switch; and
applying device congestion control to a second communication using the second controller based at least in part on the first congestion score, the first congestion time indicator, the second congestion score, and the second congestion time indicator.

11. The method according to claim 10, wherein:
the first controller includes a first Non-Volatile Memory Express (NVMe) over Fabrics (NVMe-oF) controller; and
the second controller includes a second NVMe-oF controller.

12. The method according to claim 11, wherein further comprising associating the first NVMe-oF controller and the second NVMe-oF controller based at least in part on the first NVMe-oF controller in the device communicating with a second device and the second NVMe-oF controller in the device communicating with the second device.

13. The method according to claim 11, further comprising associating the first NVMe-oF controller and the second NVMe-oF controller based at least in part on the first NVMe-oF controller in the device communicating with a second device and the second NVMe-oF controller in the device communicating with a third device, the second device and the third device in a rack.

14. The method according to claim 13, wherein associating the first NVMe-oF controller and the second NVMe-oF controller based at least in part on the first NVMe-oF controller in the device communicating with the second device and the second NVMe-oF controller in the device communicating with the third device, the second device and the third device in a rack, includes:
identifying the switch along a first path from the first NVMe-oF controller to the second device; and
identifying the switch along a second path from the second NVMe-oF controller to the third device.

15. The method according to claim 11, further comprising associating the first NVMe-oF controller and the second NVMe-oF controller based at least in part on the first NVMe-oF controller in the device communicating with a second device and the second NVMe-oF controller in the device communicating with a third device, the second device and the third device in a cluster.

16. The method according to claim 11, wherein determining that the first communication using the first controller is subject to network congestion at the switch includes receiving at the first NVMe-oF controller a packet for the first communication marked with a congestion notification.

17. The method according to claim 11, wherein determining that the first communication using the first controller is subject to network congestion at the switch further includes comparing a congestion score for the second NVMe-oF controller with a threshold.

18. The method according to claim 17, wherein applying device congestion control to the second communication using the second controller includes applying device congestion control to the second communication using the second controller based at least in part on the congestion score for the second NVMe-oF controller exceeding the threshold.

19. An article, comprising a non-transitory storage medium, the non-transitory storage medium having stored thereon instructions that, when executed by a machine, result in:
identifying a first controller in a device and a second controller in the device;
storing a first congestion score and a first congestion time indicator for the first controller and a second congestion score and a second congestion time indicator for the second controller in the device;
determining that a first communication using the first controller is subject to network congestion at a switch; and
applying device congestion control to a second communication using the second controller based at least in part on the first congestion score, the first congestion time indicator, the second congestion score, and the second congestion time indicator.

20. The article according to claim 19, wherein:
the first controller includes a first Non-Volatile Memory Express (NVMe) over Fabrics (NVMe-oF) controller; and
the second controller includes a second NVMe-oF controller.

* * * * *